US011421051B2

(12) United States Patent
Chen et al.

(10) Patent No.: US 11,421,051 B2
(45) Date of Patent: Aug. 23, 2022

(54) ZIRCONOCENE-TITANOCENE CATALYST SYSTEM

(71) Applicant: Dow Global Technologies LLC, Midland, MI (US)

(72) Inventors: Linfeng Chen, Missouri City, TX (US); David M. Pearson, Lake Jackson, TX (US); Michael W. Tilston, Missouri City, TX (US); Mridula Kapur, Lake Jackson, TX (US); Robert N. Reib, Hurricane, WV (US); Stephanie M. Whited, South Charleston, WV (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 125 days.

(21) Appl. No.: 16/954,396

(22) PCT Filed: Dec. 13, 2018

(86) PCT No.: PCT/US2018/065338
§ 371 (c)(1),
(2) Date: Jun. 16, 2020

(87) PCT Pub. No.: WO2019/125881
PCT Pub. Date: Jun. 27, 2019

(65) Prior Publication Data
US 2021/0079130 A1 Mar. 18, 2021

Related U.S. Application Data

(60) Provisional application No. 62/599,959, filed on Dec. 18, 2017.

(51) Int. Cl.
| | |
|---|---|
| *C08F 4/64* | (2006.01) |
| *C08F 4/76* | (2006.01) |
| *C08F 10/00* | (2006.01) |
| *C08F 4/659* | (2006.01) |
| *C08F 210/16* | (2006.01) |
| *C08F 10/02* | (2006.01) |

(52) U.S. Cl.
CPC ...... *C08F 4/65916* (2013.01); *C08F 4/65912* (2013.01); *C08F 210/16* (2013.01); *C08F 10/02* (2013.01)

(58) Field of Classification Search
CPC .. C08F 4/659; C08F 4/65916; C08F 4/65925; C08F 10/02; C08F 210/02; C08F 210/16
See application file for complete search history.

(56) References Cited

U.S. PATENT DOCUMENTS

| | | |
|---|---|---|
| 3,146,223 A | 8/1964 | Cheney |
| 3,324,095 A | 6/1967 | Carrick et al. |
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,543,399 A | 9/1985 | Jenkins, III et al. |
| 4,588,790 A | 5/1986 | Jenkins, III et al. |
| 4,665,208 A | 5/1987 | Welborn, Jr. et al. |
| 4,851,488 A | 7/1989 | Burstain |
| 4,874,734 A | 10/1989 | Kioka et al. |
| 4,882,400 A | 11/1989 | Dumain et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 4,988,783 A | 1/1991 | Beran et al. |
| 4,994,534 A | 2/1991 | Rhee et al. |
| 5,084,534 A | 1/1992 | Welborn, Jr. et al. |
| 5,091,352 A | 2/1992 | Kioka et al. |
| 5,103,031 A | 4/1992 | Smith, Jr. |
| 5,124,418 A | 6/1992 | Welborn, Jr. |
| 5,157,137 A | 10/1992 | Sangokoya |
| 5,183,867 A | 2/1993 | Welborn, Jr. |
| 5,194,529 A | 3/1993 | McCullough, Jr. et al. |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,276,115 A | 1/1994 | Bohmer et al. |
| 5,308,815 A | 5/1994 | Sangokoya |
| 5,329,032 A | 7/1994 | Tran et al. |
| 5,352,749 A | 10/1994 | DeChellis et al. |
| 5,391,529 A | 2/1995 | Sangokoya |
| 5,391,793 A | 2/1995 | Marks et al. |
| 5,462,999 A | 10/1995 | Griffin et al. |
| 5,541,270 A | 7/1996 | Chinh et al. |
| 5,627,242 A | 5/1997 | Jacobsen et al. |
| 5,650,528 A | 7/1997 | Frey et al. |
| 5,665,818 A | 9/1997 | Tilston et al. |
| 5,677,375 A | 10/1997 | Rifi et al. |

(Continued)

FOREIGN PATENT DOCUMENTS

| | | |
|---|---|---|
| AU | 2001257423 | 1/2002 |
| BE | 839380 | 9/1976 |

(Continued)

OTHER PUBLICATIONS

Albizzati, Polypropylene Handbook, Hanser Publishers, 1996, p. 76-78.

*Primary Examiner* — Rip A Lee

(57) ABSTRACT

A zirconocene-titanocene catalyst system comprising a zirconocene catalyst and a titanocene catalyst; polyolefins; methods of making and using same; and articles containing same.

11 Claims, No Drawings

(56) References Cited

U.S. PATENT DOCUMENTS

| | | |
|---|---|---|
| 5,693,838 A | 12/1997 | Sangokoya et al. |
| 5,739,220 A | 4/1998 | Shamshoum et al. |
| 5,916,982 A | 6/1999 | Nakazawa et al. |
| 5,936,108 A | 8/1999 | Lin et al. |
| 5,959,044 A | 9/1999 | Villar |
| 6,028,151 A | 2/2000 | Wasserman et al. |
| 6,242,545 B1 | 6/2001 | Jejelowo et al. |
| 6,245,705 B1 | 6/2001 | Kissin |
| 6,258,903 B1 | 7/2001 | Mawson et al. |
| 6,291,601 B1 | 9/2001 | Debras |
| 6,316,557 B1 | 11/2001 | Sato et al. |
| 6,384,144 B1 | 5/2002 | Mecking |
| 6,462,161 B1 | 10/2002 | Cady et al. |
| 6,489,408 B2 | 12/2002 | Mawson et al. |
| 6,528,448 B1 | 3/2003 | Jensen et al. |
| 6,534,665 B1 | 3/2003 | Nunez et al. |
| 6,670,432 B1 | 12/2003 | Timmers |
| 6,921,799 B1 | 7/2005 | Follestad et al. |
| 7,662,894 B2 | 2/2010 | Hamed et al. |
| RE41,897 E | 10/2010 | Loveday et al. |
| 7,897,705 B2 | 3/2011 | Aso et al. |
| 7,960,486 B2 | 6/2011 | Aso et al. |
| 8,207,280 B2 | 6/2012 | Murray et al. |
| 8,247,588 B2 | 8/2012 | Agapiou et al. |
| 8,404,612 B2 | 3/2013 | Agapiou et al. |
| 9,045,569 B2 | 6/2015 | Jensen et al. |
| 9,403,921 B2 | 8/2016 | Bhandarkar et al. |
| 9,556,288 B2 | 1/2017 | Bhandarkar et al. |
| 10,501,563 B2 * | 12/2019 | You ........................ C08F 10/06 |
| 2006/0173123 A1 | 8/2006 | Yang et al. |
| 2008/0146755 A1 | 6/2008 | Hamed et al. |
| 2013/0289227 A1 | 10/2013 | Jensen et al. |
| 2017/0114199 A1 | 4/2017 | Yang et al. |

FOREIGN PATENT DOCUMENTS

| | | |
|---|---|---|
| CN | 105732850 | 7/2016 |
| EP | 0288226 B1 | 6/1993 |
| EP | 0561476 | 9/1993 |
| EP | 0594218 | 4/1994 |
| EP | 0279586 B1 | 5/1994 |
| EP | 0768319 | 4/1997 |
| EP | 0794200 A2 | 9/1997 |
| EP | 0634421 B1 | 10/1997 |
| EP | 0802202 | 10/1997 |
| EP | 0857738 B1 | 12/2003 |
| EP | 1605000 | 12/2005 |
| EP | 0993478 B2 | 1/2011 |
| EP | 2448977 B1 | 8/2015 |
| EP | 3255066 | 12/2017 |
| JP | 10045819 | 2/1998 |
| JP | 03901221 B2 | 4/2007 |
| JP | 05577645 B2 | 8/2014 |
| KR | 1495423 B1 | 2/2015 |
| WO | 199410180 | 5/1994 |
| WO | 200183498 | 11/2001 |
| WO | 2010039948 A2 | 4/2010 |
| WO | 2011002497 | 1/2011 |
| WO | 2017034722 | 3/2017 |

* cited by examiner

ZIRCONOCENE-TITANOCENE CATALYST SYSTEM

FIELD

Zirconocene-titanocene catalyst system, methods, polyolefins, and articles.

INTRODUCTION

Patents about the field include U.S. Pat. Nos. 6,242,545 B1; 6,258,903 B1; 8,247,588 B2; 8,404,612 B2; and 9,045,569 B2 ("JENSEN"). JENSEN's examples reveal rapid catalyst activity decay as molar amount of (B) titanium-containing metallocene compound increases relative to molar amount of (A) metallocene pre-catalyst compound or polymerization active metallocene compound. And polymerization of olefins (e.g., ethylene and alpha-olefin) catalyzed by a zirconocene catalyst may have difficulty making higher molecular weight polyolefin.

SUMMARY

A zirconocene-titanocene catalyst system comprising a zirconocene catalyst and a titanocene catalyst, wherein the zirconocene catalyst comprises a product of an activation reaction of $((R^1)_x$-cyclopentadienyl$)((R^2)_y$-cyclopentadienyl)zirconium dichloride/dibromide/dialkyl and an alkylaluminoxane, wherein subscript x is 1 or 2; subscript y is 0, 1 or 2; and each $R^1$ and $R^2$ independently is methyl, ethyl, a normal-$(C_3$-$C_{10})$alkyl (linear), or an iso-$(C_3$-$C_{10})$alkyl; and wherein the titanocene catalyst comprises a product of an activation reaction of bis(cyclopentadienyl)titanium dichloride with a trialkylaluminum. The zirconocene catalyst is active in a polymerization reactor for catalyzing polymerization of an olefin monomer to make a polyolefin. The titanocene catalyst is active at the same time in the polymerization reactor for catalyzing the hydrogenation of an olefin monomer to make an alkane. The zirconocene and titanocene catalysts are complementary-functioning in the sense that the olefin polymerization reaction catalyzed by the zirconocene may generate molecular hydrogen ($H_2$) as a by-product, whereas the hydrogenation reaction catalyzed by the titanocene catalyst may function to consume the molecular hydrogen so generated.

A method of making the inventive (pro)catalyst systems, a method of polymerizing olefin (co)monomer(s) therewith, polyolefins made by the method, and manufactured articles containing or made from the polyolefins.

DETAILED DESCRIPTION

The Introduction, Summary and Abstract are incorporated here by reference.

Certain inventive embodiments are numbered below for cross-referencing.

Aspect 1. A zirconocene-titanocene catalyst system comprising a zirconocene catalyst and a titanocene catalyst, wherein the zirconocene catalyst comprises a product of an activation reaction of $((R^1)_x$-cyclopentadienyl$)((R^2)_y$-cyclopentadienyl)zirconium dichloride/dibromide/dialkyl and an alkylaluminoxane, wherein subscript x is 1 or 2; subscript y is 0, 1 or 2; and each $R^1$ and $R^2$ independently is methyl, ethyl, a normal-$(C_3$-$C_{10})$alkyl (linear), or an iso-$(C_3$-$C_{10})$alkyl; and wherein the titanocene catalyst comprises a product of an activation reaction of bis(cyclopentadienyl)titanium dichloride with a trialkylaluminum; wherein the zirconocene-titanocene catalyst system is characterized by a weight/weight ratio of trialkylaluminum to the zirconocene catalyst from 0.005 to 0.25, alternatively from 0.01 to 0.20, alternatively from 0.02 to 0.10; alternatively characterized by a Al/Zr molar ratio from 0.005 to 0.25, alternatively from 0.01 to 0.20, alternatively from 0.02 to 0.10; and wherein the zirconocene-titanocene catalyst system is characterized by a weight/weight ratio of bis(cyclopentadienyl)titanium dichloride to the zirconocene catalyst from 0.001 to 0.05, alternatively from 0.002 to 0.025, alternatively from 0.004 to 0.020; alternatively by a Ti/Zr molar ratio from 0.001 to 0.05, alternatively from 0.002 to 0.025, alternatively from 0.004 to 0.020. The zirconocene-titanocene catalyst system may further comprise an olefin monomer (e.g., ethylene), wherein the zirconocene catalyst and the titanocene catalyst are spaced apart from each other via the olefin monomer in the zirconocene-titanocene catalyst system.

Aspect 2. The zirconocene-titanocene catalyst system of aspect 1 further comprising a metal carboxylate salt, wherein the metal carboxylate salt is represented by the formula: $MQ_m(O_2CR)_n$, wherein M is a metal atom of Group 2 or Group 13 of the Periodic table of Elements; Q is a halogen, hydroxy, alkyl, alkoxy, aryloxy, siloxy, silyl, or sulfonate group; R is a $(C_5$-$C_{30})$hydrocarbyl; subscript m is an integer from 0 to 3; subscript n is an integer from 1 to 3; and the sum of subscripts m and n is equal to the valence of M. In some aspects M is a metal atom of Group 2, alternatively Mg or Ca, alternatively Mg, alternatively Ca, alternatively a metal atom of Group 13, alternatively B or Al, alternatively B, alternatively Al. In some aspects Q is a halogen; alternatively hydroxy; alternatively alkyl, alkoxy, or aryloxy; alternatively alkyl; alternatively alkoxy; alternatively aryloxy; alternatively siloxy or silyl; alternatively siloxy; alternatively silyl; alternatively sulfonate group. In some aspects subscript m is an integer from 0 to 2, alternatively 1 to 3, alternatively 1 or 2, alternatively 2 or 3, alternatively 0, alternatively 1, alternatively 2, alternatively 3. In some aspects subscript n is an integer from 1 to 3, alternatively 2 to 4, alternatively 1 or 2, alternatively 3, alternatively 1, alternatively 2. In some aspects the sum of subscripts m and n is equal to the valence of M which is equal to 2, alternatively 3.

Aspect 3. The zirconocene-titanocene catalyst system of aspect 1 or 2 characterized by any one of limitations (i) to (vi): (i) subscript x is 1 and subscript y is 0, (ii) subscripts x and y are each 1, (iii) subscript x is 1 and subscript y is 2, (iv) subscript x is 2 and subscript y is 0, (v) subscript x is 2 and subscript y is 1, (vi) subscript x is 2 and subscript y is 2. When subscript y is 0, the $((R^2)_y$-cyclopentadienyl) is unsubstituted cyclopentadienyl.

Aspect 4. The zirconocene-titanocene catalyst system of any one of aspects 1 to 3 characterized by any one of limitations (i) to (xxx), alternatively (xxxi) to (xLiii): (i) at least one of $R^1$ and $R^2$ independently is methyl; (ii) at least one of $R^1$ and $R^2$ independently is ethyl; (iii) at least one of $R^1$ and $R^2$ independently is a normal-$(C_3$-$C_{10})$alkyl (linear); (iv) at least one of $R^1$ and $R^2$ independently is an iso-$(C_3$-$C_{10})$alkyl; (v) at least one of $R^1$ independently is a normal-$(C_3$-$C_{10})$alkyl (linear) or an iso-$(C_3$-$C_{10})$alkyl and at least one of $R^2$ independently is a normal-$(C_3$-$C_{10})$alkyl (linear) or an iso-$(C_3$-$C_{10})$alkyl; (vi) at least one of $R^1$ independently is a normal-$(C_3$-$C_{10})$alkyl (linear) and at least one of $R^2$ independently is a normal-$(C_3$-$C_{10})$alkyl (linear); (vii) at least one of $R^1$ independently is an iso-$(C_3$-$C_{10})$alkyl and at least one of $R^2$ independently is an iso-$(C_3$-$C_{10})$alkyl; (viii) the $((R^1)_x$-cyclopentadienyl) and the $((R^2)_y$-cyclopentadienyl) are different (e.g., one is propylcyclopentadienyl) and the other is cyclopentadienyl or methylcyclopentadienyl); (ix) the (($R^1$)$_x$-cyclopentadienyl) and the (($R^2$)$_y$-cyclopentadienyl) are the same (e.g., both are propylcyclopentadienyl); (x) subscripts x and y are each 1 and each of $R^1$ and $R^2$ is the same; (xi) subscripts x and y are each 1 and each of $R^1$ and $R^2$ is a same normal-($C_3$-$C_{10}$)alkyl; (xii) subscripts x and y are each 1 and each of $R^1$ and $R^2$ is a same normal-($C_3$-$C_4$)alkyl; (xiii) subscripts x and y are each 1 and each of $R^1$ and $R^2$ is propyl; (xiv) the dichloride/dibromide/dialkyl is a dichloride or a dibromide, alternatively a dichloride; (xv) the dichloride/dibromide/dialkyl is a dialkyl, wherein each alkyl independently is a ($C_1$-$C_{10}$)alkyl, alternatively a ($C_2$-$C_{10}$)alkyl, alternatively a ($C_1$-$C_4$)alkyl, alternatively a ($C_2$-$C_6$)alkyl; (xvi) the dichloride/dibromide/dialkyl is a dialkyl and each alkyl independently is selected from methyl, ethyl, 1-methylethyl, propyl, butyl, 1-methylpropyl, and 2-methylpropyl; (xvii) the dichloride/dibromide/dialkyl is a dialkyl and each alkyl independently is selected from methyl, ethyl, propyl, and butyl; (xviii) the dichloride/dibromide/dialkyl is a dialkyl and each alkyl independently is selected from methyl, ethyl, and propyl; (xix) the dichloride/dibromide/dialkyl is a dialkyl and each alkyl independently is selected from methyl and propyl; (xx) the dichloride/dibromide/dialkyl is a dialkyl and each alkyl independently is selected from methyl and ethyl; (xxi) the dichloride/dibromide/dialkyl is a dialkyl and each alkyl is methyl; (xxii) the dichloride/dibromide/dialkyl is a dialkyl and each alkyl is ethyl; (xxiii) the (($R^1$)$_x$-cyclopentadienyl)(($R^2$)$_y$-cyclopentadienyl)zirconium dichloride/dibromide/dialkyl is selected from bis(butylcyclopentadienyl)zirconium dichloride, bis(butylcyclopentadienyl)zirconium dibromide, bis(butylcyclopentadienyl)zirconium dimethyl, and bis(butylcyclopentadienyl)zirconium diethyl; (xxiv) the (($R^1$)$_x$-cyclopentadienyl)(($R^2$)$_y$-cyclopentadienyl)zirconium dichloride/dibromide/dialkyl is bis(butylcyclopentadienyl) zirconium dichloride; (xxv) the (($R^1$)$_x$-cyclopentadienyl) (($R^2$)$_y$-cyclopentadienyl)zirconium dichloride/dibromide/dialkyl is bis(butylcyclopentadienyl)zirconium dimethyl; (xxvi) the (($R^1$)$_x$-cyclopentadienyl)(($R^2$)$_y$-cyclopentadienyl)zirconium dichloride/dibromide/dialkyl is bis(butylcyclopentadienyl)zirconium diethyl; (xxvii) the (($R^1$)$_x$-cyclopentadienyl)(($R^2$)$_y$-cyclopentadienyl)zirconium dichloride/dibromide/dialkyl is selected from bis(1-methyl-3-butylcyclopentadienyl)zirconium dichloride, bis(1-methyl-3-butylcyclopentadienyl)zirconium dibromide, bis(1-methyl-3-butylcyclopentadienyl)zirconium dimethyl, and bis(1-methyl-3-butylcyclopentadienyl)zirconium diethyl; (xxviii) the (($R^1$)$_x$-cyclopentadienyl)(($R^2$)$_y$-cyclopentadienyl)zirconium dichloride/dibromide/dialkyl is bis(1-methyl-3-butylcyclopentadienyl)zirconium dichloride; (xxix) the (($R^1$)$_x$-cyclopentadienyl)(($R^2$)$_y$-cyclopentadienyl)zirconium dichloride/dibromide/dialkyl is bis(1-methyl-3-butylcyclopentadienyl)zirconium dimethyl; and (xxx) the (($R^1$)$_x$-cyclopentadienyl)(($R^2$)$_y$-cyclopentadienyl)zirconium dichloride/dibromide/dialkyl is bis(1-methyl-3-butylcyclopentadienyl)zirconium diethyl; alternatively any one of (xxxi) both (i) and any one of (xiv) to (xxii); (xxxii) both (ii) and any one of (xiv) to (xxii); (xxxiii) both (iii) and any one of (xiv) to (xxii); (xxxiv) both (iv) and any one of (xiv) to (xxii); (xxxv) both (v) and any one of (xiv) to (xxii); (xxxvi) both (vi) and any one of (xiv) to (xxii); (xxxvii) both (vii) and any one of (xiv) to (xxii); (xxxviii) both (viii) and any one of (xiv) to (xxii); (xxxix) both (ix) and any one of (xiv) to (xxii); (xL) both (x) and any one of (xiv) to (xxii); (xLi) both (xi) and any one of (xiv) to (xxii); (xLii) both (xii) and any one of (xiv) to (xxii); and (xLiii) both (xiii) and any one of (xiv) to (xxii); alternatively any one of (xxiii) to (xxx).

Aspect 5. The zirconocene-titanocene catalyst system of any one of aspects 1 to 4 wherein the trialkylaluminum is selected from any one of limitations (i) to (vii): (i) tri(($C_1$-$C_8$)alkyl)aluminum, (ii) tri(($C_3$-$C_7$)alkyl)aluminum, (iii) tri (($C_4$-$C_6$)alkyl)aluminum, (iv) tri(($C_4$)alkyl)aluminum, (v) tri(($C_6$)alkyl)aluminum, (vi) tri(2-methylpropyl)aluminum (i.e., tri(isobutyl)aluminum, also known as T2MPAl), and (vii) tri(hexyl)aluminum (also known as tri(n-hexyl)aluminum or TnHAl).

Aspect 6. The zirconocene-titanocene catalyst system of any one of aspects 1 to 5 wherein the zirconocene catalyst is supported (disposed) on a carrier material. The carrier material may comprise dehydrated untreated porous silica, wherein the interior and exterior surfaces are hydrophilic. The supported (($R^1$)$_x$-cyclopentadienyl)(($R^2$)$_y$-cyclopentadienyl)zirconium dichloride/dibromide/dialkyl may be made by a concentrating method comprising suspending the silica (dehydrated, porous, untreated) in a saturated and/or aromatic hydrocarbon (e.g., toluene and/or heptane) solution of the (($R^1$)$_x$-cyclopentadienyl)(($R^2$)$_y$-cyclopentadienyl)zirconium dichloride/dibromide/dialkyl to form a mixture, and then concentrating the mixture under vacuum to give the supported (($R^1$)$_x$-cyclopentadienyl)(($R^2$)$_y$-cyclopentadienyl) zirconium dichloride/dibromide/dialkyl, which may be subsequently activated by contacting it with the methylaluminoxane.

Aspect 7. The zirconocene-titanocene catalyst system of any one of aspects 1 to 5 wherein the zirconocene catalyst and, optionally, the titanocene catalyst, is spray-dried (disposed by spray-drying) on a carrier material. Alternatively, the (($R^1$)$_x$-cyclopentadienyl)(($R^2$)$_y$-cyclopentadienyl)zirconium dichloride/dibromide/dialkyl may be spray-dried on the carrier material in the absence of the titanocene catalyst, then the spray-dried (($R^1$)$_x$-cyclopentadienyl)(($R^2$)$_y$-cyclopentadienyl)zirconium dichloride/dibromide/dialkyl/carrier material may be contacted with the alkylaluminoxane to make the zirconocene catalyst on the spray-dried carrier material. The carrier material may comprise dehydrated untreated silica, which is porous, wherein the interior and exterior surfaces are hydrophilic, or the carrier material may comprise a hydrophobic pre-treated fumed silica, wherein the interior and exterior surfaces have been made hydrophobic by pre-treatment with a hydrophobing agent. The spray-dried zirconocene catalyst or (($R^1$)$_x$-cyclopentadienyl) (($R^2$)$_y$-cyclopentadienyl)zirconium dichloride/dibromide/dialkyl may be made by a spray-drying method comprising suspending the dehydrated untreated silica or on the hydrophobic pre-treated silica (pre-treated with a hydrophobing agent) in a saturated and/or aromatic hydrocarbon liquid (e.g., hexanes, heptane, mineral oil, and/or toluene) solution of the zirconocene catalyst or the (($R^1$)$_x$-cyclopentadienyl) (($R^2$)$_y$-cyclopentadienyl)zirconium dichloride/dibromide/dialkyl to form a respective mixture thereof, and spray-drying the mixture to give the spray-dried zirconocene catalyst or spray-dried (($R^1$)$_x$-cyclopentadienyl)(($R^2$)$_y$-cyclopentadienyl)zirconium dichloride/dibromide/dialkyl on the untreated or hydrophobic pre-treated silica. The spray-dried (($R^1$)$_x$-cyclopentadienyl)(($R^2$)$_y$-cyclopentadienyl)zirconium dichloride/dibromide/dialkyl may be subsequently activated on the carrier material by contacting the former with the alkylaluminoxane. The alkylaluminoxane may be a methylaluminoxane (MAO), a modified MAO, or a silica supported MAO. The zirconocene catalyst may be unsupported/not spray-dried, or supported, or spray-dried. The supported zirconocene catalyst may be made by a concentrating method instead of a spray-drying method. The concentrating method may comprise suspending the silica such as the dehydrated untreated silica, in an alkane(s) and/or aromatic hydrocarbon liquid (e.g., hexanes, heptane, mineral oil, and/or toluene) solution of zirconocene catalyst, or the alkylaluminoxane and the $((R^1)_x$-cyclopentadienyl)$((R^2)_y$-cyclopentadienyl)zirconium dichloride/dibromide/dialkyl, to form a mixture, and then concentrating the mixture under vacuum to give the supported zirconocene catalyst.

Aspect 8. A method of making a zirconocene-titanocene catalyst system, the method comprising contacting the $((R^1)_x$-cyclopentadienyl)$((R^2)_y$-cyclopentadienyl)zirconium dichloride/dibromide/dialkyl with an alkylaluminoxane and, optionally, a carrier material and, optionally, a metal carboxylate salt of the formula: $MQ_m(O_2CR)_n$, wherein M, Q, R, m and n are as defined above, to give zirconocene catalyst, and then contacting the zirconocene catalyst with a titanocene catalyst made by an activation reaction of bis(cyclopentadienyl)titanium dichloride with a trialkylaluminum; thereby giving the titanium catalyst and the zirconocene-titanocene catalyst system. The carrier material and metal carboxylate salt may be used in the contacting step and resulting zirconocene-titanocene catalyst system, which may be that of any one of aspects 1 to 7. The zirconocene catalyst and the titanocene catalyst are made separately from each other, and then brought together to give the zirconocene-titanocene catalyst system. The zirconocene catalyst and, optionally, the titanocene catalyst may be spray-dried, alternatively supported on a carrier material as described above. The activation reactions independently may be run under an inert gas atmosphere and in a saturated and/or aromatic hydrocarbon solvent, such as an alkane; a mixture of two or more alkanes; a mineral oil; an alkyl-substituted benzene such as toluene, ethylbenzene, or xylenes; or a mixture of any two or more thereof. The zirconocene catalyst and/or the titanocene catalyst independently may be dried by removing the saturated and/or aromatic hydrocarbon solvent therefrom to give dried particulate solid forms thereof, respectively, which may then be contacted together to give a dried particulate solid form of the zirconocene-titanocene catalyst system. Alternatively, the zirconocene-titanocene catalyst system may be formed in the saturated and/or aromatic hydrocarbon solvent, and then the solvent removed therefrom to give a dried particulate solid form of the zirconocene-titanocene catalyst system.

Aspect 9. A method of making a polyethylene composition, the method comprising contacting ethylene (monomer) and optionally zero, one, or more $(C_3-C_{20})$alpha-olefin (comonomer(s)) with the zirconocene-titanocene catalyst system of any one of aspects 1-7 or that made by the method of aspect 8 in a polymerization reactor to generate a polymerization reaction giving a polyethylene composition comprising a polyethylene homopolymer or ethylene/$(C_3-C_{20})$alpha-olefin copolymer, respectively, and the zirconocene-titanocene catalyst system, or a by-product thereof. Without wishing to be bound by theory, it is believed that the zirconocene catalyst functions in the method to enhance or increase the rate of polymerization of monomer and/or any comonomer(s), and the titanocene catalyst functions in the method to enhance or increase the rate of consumption of molecular hydrogen ($H_2$), whether the $H_2$ has been generated in situ as a by-product of the polymerization reaction or whether externally-sourced $H_2$ has been purposely added into the polymerization reactor, such as for controlling a property, e.g., $I_2$, of the product polyethylene homopolymer or ethylene/$(C_3-C_{20})$alpha-olefin copolymer. The polymerization reaction is conducted during the contacting step and under effective polymerization conditions. The polymerization reaction may be conducted in a gas phase or a liquid-phase. The liquid-phase may be a slurry phase or solution phase. The method may be characterized by any one of steps (i) to (iii): (i) the zirconocene catalyst and the titanocene catalyst are premixed in a separate mixing vessel, and the premixture is then fed into the polymerization reactor; (ii) the zirconocene catalyst and the titanocene catalyst are contacted with each other just before entering the polymerization reactor, such as for example contacted together in a feedline inletting into the reactor; and (iii) the zirconocene catalyst and the titanocene catalyst are fed separately via separate inlet locations into the polymerization reactor, thereby making the zirconocene-titanocene catalyst system in situ. In the step (ii) the zirconocene catalyst and the titanocene catalyst may be contacted with each other and, optionally an alkanes or alkarene solvent (e.g., hexanes, heptane, toluene, mineral oil), but not with olefin monomer, for from >0 to 5 minutes, alternatively from >0 to 3 minutes, alternatively from >0 to 1 minute, to form a premixture comprising, alternatively consisting essentially of, alternatively consisting of the zirconocene and titanocene catalysts, and then the premixture is contacted with the ethylene and optionally $(C_3-C_{20})$alpha-olefin. After such second contacting step, the zirconocene and titanocene catalyst may become spaced apart from each other by the ethylene and, optionally, $(C_3-C_{20})$alpha-olefin. The zirconocene catalyst and the titanocene catalyst of the zirconocene-titanocene catalyst system made in situ in embodiment (iii) are spaced apart from each other in the polymerization reactor by the ethylene and, if present, the $(C_3-C_{20})$alpha-olefin (comonomer(s)). In some aspects the method comprises copolymerizing ethylene and one or more $(C_3-C_{20})$alpha-olefin (comonomer(s)) to give the ethylene/$(C_3-C_{20})$alpha-olefin copolymer composition. The $(C_3-C_{20})$alpha-olefin-derived comonomeric constituent units may be derived from 1-butene; alternatively 1-hexene; alternatively 1-octene; alternatively a combination of any two thereof. In some aspects the extent of increase of Mw of the inventive polyolefin may be at least partly a function of whether or not an externally-sourced $H_2$ is added to the reactor. For example, when externally-sourced $H_2$ is not added to the reactor, the inventive Mw may be at least 5% higher than the comparative Mw when externally-sourced $H_2$ is not added to the reactor. When externally-sourced $H_2$ is added to the reactor, the inventive Mw may be at least 10% higher than the comparative Mw when externally-sourced $H_2$ is added to the reactor. Without wishing to be bound by theory, it is believed that under (co)polymerization conditions in the absence of externally-added $H_2$, catalyst activity of the zirconocene catalyst would decrease significantly wherein, prior to contacting the zirconocene-titanocene catalyst system with ethylene and alpha-olefin, a same quantity of the zirconocene catalyst is premixed with increasing quantities of the titanocene catalyst to form premixtures having increasing molar ratio of the titanocene catalyst to zirconocene catalyst, and the premixtures are then contacted with ethylene and alpha-olefin under (co)polymerizing conditions. Beneficially, the decrease in catalyst activity of the zirconocene catalyst may be substantially attenuated or prevented by not premixing the zirconocene and titanocene catalysts, but instead adding the zirconocene catalyst and the titanocene catalyst separately into, at spaced apart locations in, the reactor.

Aspect 10. The method of aspect 9 characterized by any one of limitations (i) to (iv): (i) externally-sourced (from outside the reactor) molecular hydrogen gas ($H_2$) is not added into the polymerization reactor and is not present during the contacting step of the method; (ii) the method further comprises adding externally-sourced $H_2$ gas into the polymerization reactor during the contacting step of the method; (iii) the method is free of $(C_3-C_{20})$alpha-olefin (comonomer(s)) and makes the polyethylene homopolymer, which contains constituent units that are derived from ethylene only; (iv) the method further comprises one or more $(C_3-C_{20})$alpha-olefin (comonomer(s)) and makes the ethylene/$(C_3-C_{20})$alpha-olefin copolymer, which contains monomeric constituent units that are derived from ethylene and comonomeric constituent units that are derived from one or more $(C_3-C_{20})$alpha-olefin comonomer(s), respectively; alternatively any one of (v) to (viii): (v) both (i) and (iii); (vi) both (i) and (iv); (vii) both (ii) and (iii); and (viii) both (ii) and (iv). Without wishing to be bound by theory, it is believed that the ethylene/$(C_3-C_{20})$alpha-olefin copolymer made by the inventive method has a higher Mw than Mw of a comparative copolymer that would be made by a comparative method that is the same as the inventive method except wherein the comparative method is free of the titanocene catalyst, e.g., free of Ti.

Aspect 11. The method of aspect 9 or 10 comprising a gas phase polymerization optionally in the presence of added external molecular hydrogen gas ($H_2$), optionally in the presence of an induced condensing agent (ICA); and in one, two or more gas phase polymerization reactors under (co) polymerizing conditions, thereby making the polyethylene composition. The (co)polymerizing conditions comprise a reaction temperature from 80 degrees) (°) to 110° Celsius (C.); a molar ratio of the molecular hydrogen gas to the ethylene ($H_2/C_2$ molar ratio) from 0.00001 to 0.25, alternatively from 0.000030 to 0.00010, alternatively 0.0001 to 0.20, alternatively from 0.001 to 0.050; and a molar ratio of the comonomer to the ethylene ($C_x/C_2$) from 0.001 to 0.20, alternatively from 0.002 to 0.14, alternatively 0.005 to 0.10.

Aspect 12. The method of any one of aspects 9 to 11 wherein prior to the contacting step the method further comprises any one of steps (i) to (iii): (i) premixing the zirconocene catalyst and the titanocene catalyst in a separate mixing vessel to make a premixture thereof, aging the premixture for from 2 hours to 7 days to make an aged premixture, and then feeding the aged premixture into the polymerization reactor; (ii) premixing the zirconocene catalyst and the titanocene catalyst with each other in a mixer (e.g., an in-line mixer) to make an unaged premixture thereof, and within 120 minutes (alternatively less than 90 minutes, alternatively less than 59 minutes, alternatively less than 11 minutes, alternatively less than 5 minutes) of the premixing, feeding the unaged premixture into the polymerization reactor; and (iii) feeding the zirconocene catalyst and the titanocene catalyst separately via separate reactor inlets (separate injectors spaced apart on reactor) into the polymerization reactor, thereby making the zirconocene-titanocene catalyst system in situ in the polymerization reactor.

Aspect 13. A polyethylene composition made by the method of aspect 9, 10, 11, or 12.

Aspect 14. A manufactured article comprising a shaped form of the polyethylene composition of aspect 13. The manufactured article may be a coating, film, sheet, extruded article, injection molded article; a coating layer (e.g., of a coated article), pipe, film (e.g., blown film), agricultural film, food packaging, garment bags, grocery bags, heavy-duty sacks, industrial sheeting, pallet and shrink wraps, bags, buckets, freezer containers, lids, and toys.

The zirconocene-titanocene catalyst system may be a homogeneous system that is free of a finely-divided solid that is not an embodiment of the zirconocene or titanocene catalyst. The homogeneous system may comprise a solution of the zirconocene-titanocene catalyst system in an aprotic hydrocarbon liquid such as a $(C_5-C_{12})$alkane, a mineral oil, an alkarene (e.g., toluene or xylenes), or a mixture of any two or more thereof; and is free of a support material such as $MgCl_2$ and free of a carrier material such as an alumina, clay, or silica. Alternatively, the zirconocene-titanocene catalyst system may be a heterogeneous system comprising a supported or spray-dried, alternatively a spray-dried form of the zirconocene catalyst on finely-divided solid that is a support material such as $MgCl_2$ and/or a carrier material such as an alumina, clay, or silica and an unsupported, supported, or spray-dried form of the titanocene catalyst independently on the same, alternatively different finely-divided solid. In some embodiments the zirconocene-titanocene catalyst system further comprises silica, wherein the zirconocene catalyst is spray-dried on the silica and wherein the titanocene catalyst is free of silica; and optionally wherein the spray-dried zirconocene catalyst and the titanocene catalyst are fed separately via separate inlet locations into the polymerization reactor, thereby making the zirconocene-titanocene catalyst system in situ.

In some embodiments the zirconocene-titanocene catalyst system and method of polymerization may further comprise a non-titanocene hydrogenation catalyst such as bis(1,5-cyclooctadiene)nickel; dicarbonylcyclopentadienylcobalt $(C_5H_5Co(CO)_2)$); bis(cyclopentadienyl)nickel; or cobalt(II) 2-ethylhexanoate; or may further comprise a titanium alkoxide such as titanium tetrabutoxide.

The zirconocene-titanocene catalyst system may be free of hafnium.

$((R^1)_x$-cyclopentadienyl)$((R^2)_y$-cyclopentadienyl)zirconium dichloride/dibromide/dialkyl. A $((R^1)_x$-cyclopentadienyl)$((R^2)_y$-cyclopentadienyl)zirconium dichloride, $((R^1)_x$-cyclopentadienyl)$((R^2)_y$-cyclopentadienyl)zirconium dibromide, or $((R^1)_x$-cyclopentadienyl)$((R^2)_y$-cyclopentadienyl)zirconium dialkyl. The $((R^1)_x$-cyclopentadienyl)$((R^2)_y$-cyclopentadienyl)zirconium dichloride/dibromide/dialkyl may be prepared by any suitable method such as that described in U.S. Pat. No. 6,242,545 B1 and the US patents, EP publications, and PCT publications referenced in column 3, at lines 48 to 60. In some embodiments the $((R^1)_x$-cyclopentadienyl)$((R^2)_y$-cyclopentadienyl)zirconium dichloride/dibromide/dialkyl may be obtained from a commercial source. In other embodiments the $((R^1)_x$-cyclopentadienyl)$((R^2)_y$-cyclopentadienyl)zirconium dichloride/dibromide/dialkyl may be synthesized according to any suitable method.

An illustrative example of a synthesis of $((R^1)_x$-cyclopentadienyl)$((R^2)_y$-cyclopentadienyl)zirconium dichloride/dibromide/dialkyl is a synthesis of bis(butylcyclopentadienyl) zirconium dichloride/dibromide/dimethyl, which is a compound of formula $(BuCp)_2ZrCl_2$, $(BuCp)_2ZrBr_2$, or $(BuCp)_2Zr(CH_3)_2$, respectively, wherein BuCp is a butylcyclopentadienyl anion of formula $CH_3CH_2CH_2CH_2[C_5H_4^{-1}]$. The bis(butylcyclopentadienyl)zirconium dichloride may be synthesized by contacting 2 mole equivalents of butylcyclopentadiene with 2 mole equivalents of an alkyl lithium in an aprotic solvent under conditions sufficient to make 2 mole equivalents of butylcyclopentadienyl anion. Then the 2 mole equivalents of the butylcyclopentadienyl anion may be contacted with 1 mole equivalent of zirconium tetrachloride or zirconium tetrabromide in an aprotic solvent under conditions sufficient to make 1 mole equivalent of the bis(butyl-cyclopentadienyl)zirconium dichloride or 1 mole equivalent of the bis(butylcyclopentadienyl)zirconium dibromide, respectively, and 2 mole equivalents of lithium chloride or lithium bromide, respectively, as a by-product. The 1 mole equivalent of the bis(butylcyclopentadienyl)zirconium dimethyl may be made by contacting the bis(butylcyclopentadienyl)zirconium dichloride or the bis(butylcyclopentadienyl)zirconium dibromide with 2 mole equivalents of methyl lithium in an aprotic solvent under conditions sufficient to make 1 mole equivalent of the bis(butylcyclopentadienyl)zirconium dimethyl and another 2 mole equivalents of lithium chloride or lithium bromide, respectively, as a by-product. The butylcyclopentadiene may be obtained from a commercial source or synthesized by any suitable known method for making alkylcyclopentadienes. The methyl lithium may be replaced with another alkyl lithium, such as ethyl lithium, propyl lithium, butyl lithium, or the like, when synthesizing a bis(butylcyclopentadienyl)zirconium dialkyl that is a diethyl, dipropyl, dibutyl, or the like, respectively. The aprotic solvent may be an alkane(s) or an alkyl ether. The alkanes may be hexanes, heptane, cycloheptane, or a mineral oil. The alkyl ether may be diethyl ether, tetrahydrofuran, or 1-4-dioxane. The conditions sufficient to make the foregoing compounds may be an inert gas atmosphere, a suitable temperature, and appropriate techniques for handling air and/or moisture sensitive reactions such as Schlenk line techniques. The inert gas of the inert gas atmosphere may be a gas of anhydrous molecular nitrogen, helium, argon, or a combination of any two or more thereof. The suitable temperature may be from −100° to 25° C., alternatively from −78° to 5° C., alternatively from −50° to −5° C.

The zirconocene-titanocene catalyst system may be used in gas phase or liquid phase olefin polymerization reactions to enhance the rate of polymerization of monomer and/or comonomer(s). Liquid phase reactions include slurry phase and solution phase. In some aspects the olefin polymerization reaction is conducted in gas phase, alternatively liquid phase, alternatively slurry phase, alternatively solution phase. Conditions for gas phase and liquid phase olefin polymerization reactions are generally well-known. For illustration, conditions for gas phase olefin polymerization reactions are described below.

The polymerization may be conducted in a high pressure, liquid phase or gas phase polymerization reactor to yield the inventive polyethylene composition. Such reactors and methods are generally well-known in the art. For example, the liquid phase polymerization reactor/method may be solution phase or slurry phase such as described in U.S. Pat. No. 3,324,095. The gas phase polymerization reactor/method may employ stirred-bed gas-phase polymerization reactors (SB-GPP reactors) and fluidized-bed gas-phase polymerization reactors (FB-GPP reactors) and an induced condensing agent and be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other useful gas phase processes include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

In an illustrative embodiment the polymerization method uses a pilot scale fluidized bed gas phase polymerization reactor (Pilot Reactor) that comprises a reactor vessel containing a fluidized bed of a powder of ethylene/alpha-olefin copolymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, optionally alpha-olefin, optionally hydrogen, and optionally oxygen being fed into the Pilot Reactor are monitored by an in-line gas chromatograph in the cycle loop so as to maintain specific concentrations that define and enable control of polymer properties. The gases may be cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The zirconocene-titanocene catalyst system may be fed as a slurry or dry powder into the Pilot Reactor from high pressure devices, wherein the slurry is fed via a syringe pump and the dry powder is fed via a metered disk. The catalyst system typically enters the fluidized bed in the lower ⅓ of its bed height. The Pilot Reactor further comprises a way of weighing the fluidized bed and isolation ports (Product Discharge System) for discharging the powder of ethylene/alpha-olefin copolymer from the reactor vessel in response to an increase of the fluidized bed weight as polymerization reaction proceeds.

(Co)polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the inventive polyethylene composition.

At least one, alternatively each of the (co)polymerizing conditions may be fixed (i.e., unchanged) during production of the inventive polyethylene composition. Such fixed (co)polymerizing conditions may be referred to herein as steady-state (co)polymerizing conditions. Steady-state (co)polymerizing conditions are useful for continuously making embodiments of the inventive polyethylene composition having same polymer properties.

Alternatively, at least one, alternatively two or more of the (co)polymerizing conditions may be varied within their defined operating parameters during production of the inventive polyethylene composition so as to transition from the production of a first embodiment of the inventive polyethylene composition having a first set of polymer properties to a non-inventive polyethylene composition or to a second embodiment of the inventive polyethylene composition having a second set of polymer properties, wherein the first and second sets of polymer properties are different and are each within the limitations described herein for the inventive polyethylene composition. For example, all other (co)polymerizing conditions being equal, a higher molar ratio of ($C_3$-$C_{20}$)alpha-olefin comonomer/ethylene feeds in the inventive method of copolymerizing produces a lower density of the resulting product inventive polyethylene composition. Transitioning from one set to another set of the (co)polymerizing conditions is permitted within the meaning of "(co)polymerizing conditions" as the operating parameters of both sets of (co)polymerizing conditions are within the ranges defined therefore herein. Beneficially a person skilled in the art may achieve any described property value for the inventive polyethylene composition in view of the transitioning teachings herein.

The (co)polymerizing conditions for gas or liquid phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, CFCl3, trichloroethane, and difluorotetrachloroethane. Scavenging agents may be a trialkylaluminum. Slurry or gas phase polymerizations may be operated free of (not deliberately added) scavenging agents. The (co)polymerizing conditions for gas phase reactors/polymerizations may further include an amount (e.g., 0.5 to 200 ppm based on all feeds into reactor) static control agents and/or continuity additives such as aluminum stearate or polyethyleneimine. Static control agents may be added to the gas phase reactor to inhibit formation or buildup of static charge therein.

The (co)polymerizing conditions may further include using molecular hydrogen to control final properties of the polyethylene composition. Such use of $H_2$ is generally described in Polypropylene Handbook 76-78 (Hanser Publishers, 1996). All other things being equal, using hydrogen can increase the melt flow rate (MFR) or melt index (MI) thereof, wherein MFR or MI are influenced by the concentration of hydrogen. A molar ratio of hydrogen to total monomer ($H_2$/monomer), hydrogen to ethylene ($H_2/C_2$), or hydrogen to comonomer ($H_2/C_x$) may be from 0.0001 to 10, alternatively 0.0005 to 5, alternatively 0.001 to 3, alternatively 0.001 to 0.10.

The (co)polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

In some aspects the gas-phase polymerization is conducted in a fluidized bed-gas phase polymerization (FB-GPP) reactor under relevant gas phase, fluidized bed polymerization conditions. Such conditions are any variable or combination of variables that may affect a polymerization reaction in the FB-GPP reactor or a composition or property of an ethylene/alpha-olefin copolymer product made thereby. The variables may include reactor design and size, catalyst composition and amount; reactant composition and amount; molar ratio of two different reactants; presence or absence of feed gases such as $H_2$ and/or $O_2$, molar ratio of feed gases versus reactants, absence or concentration of interfering materials (e.g., $H_2O$), absence or presence of an induced condensing agent (ICA), average polymer residence time (avgPRT) in the reactor, partial pressures of constituents, feed rates of monomers, reactor bed temperature (e.g., fluidized bed temperature), nature or sequence of process steps, time periods for transitioning between steps. In performing an inventive method, variables other than that/those being described or changed by the inventive method may be kept constant.

Comonomer/ethylene gas molar ratio $C_x/C_2$ of comonomer and ethylene being fed into the FB-GPP reactor may be from 0.0001 to 0.20, alternatively from 0.0001 to 0.1, alternatively from 0.0002 to 0.05, alternatively from 0.0004 to 0.02.

Ethylene partial pressure in the FB-GPP reactor. From 690 to 2070 kilopascals (kPa, i.e., from 100 to 300 psia (pounds per square inch absolute)); alternatively from 830 to 1655 kPa (120 to 240 psia), alternatively from 1300 to 1515 kPa (190 to 220 psia). Alternatively, the partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

$H_2/C_2$ gas molar ratios in the FB-GPP reactor may be from 0.00001 to 0.25.

Oxygen ($O_2$) concentration relative to ethylene ("$O_2/C_2$", volume parts $O_2$ per million volume parts ethylene (ppmv)) in the FB-GPP reactor. In some embodiments the $O_2/C_2$ is from 0.0000 to 0.20 ppmv, alternatively from 0.0001 to 0.200 ppmv, alternatively from 0.0000 to 0.183 ppmv, alternatively from 0.0000 to 0.163 ppmv.

Reactor bed temperature in the FB-GPP reactor may be from 80° to 120° C., alternatively from 81° to 115° C., alternatively from 84° to 110° C.

Residence time, average for polymer (avgPRT). The number of minutes or hours on average the polymer product resides in the FB-GPP reactor. The avgPRT may be from 30 minutes to 10 hours, alternatively from 60 minutes to 5 hours, alternatively from 90 minutes to 4 hours, alternatively from 1.7 to 3.0 hours.

Start-up or restart of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed preloaded or loaded, respectively, into the fluidized bed reactor. The polymer seedbed may be composed of powder of a polyethylene such as a polyethylene homopolymer or the ethylene/alpha-olefin copolymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively, the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin. The reagents fed into the fluidized bed reactor include the molecular hydrogen gas and the induced condensing agent (ICA) and the zirconocene-titanocene catalyst system.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., Zr required by a zirconocene) are not excluded.

Alternatively precedes a distinct embodiment. ASTM means the standards organization, ASTM International, West Conshohocken, Pa., USA. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included).

Alkyl: a monovalent radical of a saturated hydrocarbon, which may be straight chain, branched chain, or cyclic. Embodiments may be $C_1$ or higher straight chain or $C_3$ or higher branched chain; alternatively $C_1$ or higher straight chain or $C_4$ or higher penultimate branched; alternatively $C_1$ or higher straight chain; alternatively $C_4$ or higher penultimate branched. Examples of penultimate branched alkyl are 2-methylpropyl ($C_4$), 3-methylbutyl ($C_5$), 4-methylpentyl ($C_6$), 5-methylhexyl ($C_7$), 6-methylheptyl ($C_8$), 7-methyloctyl ($C_9$), and 8-methylnonyl ($C_{10}$). Penultimate branched alkyl, also known as iso-alkyl, has a methyl group bonded to the penultimate carbon atom of the chain. Iso-($C_3$-$C_{10}$)alkyl (penultimate branched) includes 1-methylethyl, 2-methylpropyl, 3-methylbutyl, 4-methylpentyl, 5-methylhexyl, 6-methylheptyl, 7-methyloctyl, and 8-methylnonyl and is an alkyl of formula —$(CH_2)_iC(H)(CH_3)_2$, wherein subscript i is an integer from 0 to 7, respectively. Normal-($C_3$-$C_{10}$)alkyl (linear) includes propyl, butyl, pentyl, hexyl, heptyl, octyl, nonyl, and decyl and is an alkyl of formula —$(CH_2)_pCH_3$, wherein subscript p is an integer from 2 to 9, respectively.

Alkylaluminoxane: also referred to as alkylalumoxane. A product of a partial hydrolysis of a trialkylaluminum compound. Embodiments may be a ($C_1$-$C_{10}$)alkylaluminoxane, alternatively a ($C_1$-$C_6$)alkylaluminoxane, alternatively a ($C_1$-$C_4$)alkylaluminoxane, alternatively a ($C_1$-$C_3$)alkylaluminoxane, alternatively a ($C_1$-$C_2$)alkylaluminoxane, alternatively a methylaluminoxane (MAO), alternatively a modified-methylaluminoxane (MMAO). In some aspects the alkylaluminoxane is a MAO. In some embodiments the alkylaluminoxane is supported on untreated silica, such as fumed silica. The alkylaluminoxane may be obtained from a commercial supplier or prepared by any suitable method. Suitable methods for preparing alkylaluminoxanes are well-known. Examples of such preparation methods are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; and 5,693,838; and in European publications EP-A-0 561 476; EP-B1-0 279 586; and EP-A-0 594-218; and in PCT publication WO 94/10180.

Alkylaluminum compound: a compound having at least one alkyl-Al group. Mono- or di-($C_1$-$C_4$)alkyl-containing aluminum compound. A mono- or di-($C_1$-$C_4$)alkyl-containing aluminium compound may be used in place of, alternatively in combination with, the trialkylaluminum. The mono- or di-($C_1$-$C_4$)alkyl-containing aluminium compound may independently contain 1 or 2 ($C_1$-$C_4$)alkyl groups, respectively, and 2 or 1 groups each independently selected from chloride atom and ($C_1$-$C_4$)alkoxide. Each ($C_1$-$C_4$)alkyl may independently be methyl; ethyl; propyl; 1-methylethyl; butyl; 1-methylpropyl; 2-methylpropyl; or 1,1-dimethylethyl. Each ($C_1$-$C_4$)alkoxide may independently be methoxide; ethoxide; propoxide; 1-methylethoxide; butoxide; 1-methylpropoxide; 2-methylpropoxide; or 1,1-dimethylethoxide. The mono- or di-($C_1$-$C_4$)alkyl-containing aluminium compound may be diethylaluminum chloride (DEAC), diethylaluminum ethoxide (DEAE), ethylaluminum dichloride (EADC), or a combination or mixture of any two or more thereof. Trialkylaluminum: a compound of formula $((C_1-C_{10})alkyl)_3Al$, wherein each ($C_1$-$C_{10}$)alkyl group is independently selected. The trialkylaluminum may be trimethylaluminum, triethylaluminum ("TEAl"), tripropylaluminum, tris(1-methylethyl)aluminum, tributylaluminum, tris(2-methylpropyl)aluminum ("T2MPAl"), tripentylaluminum, trihexylaluminum ("TnHAl"), trioctylaluminum, or a combination of any two or more thereof. In some aspects the trialkylaluminum is T2MPAl, which is of formula $((CH_3)_2C(H)CH_2)_3Al$.

Alpha-olefin. A compound of formula (I): $H_2C=C(H)—R$ (I), wherein R is a straight chain alkyl group. Embodiments may be a ($C_3$-$C_{20}$)alpha-olefin. A compound of formula (I): $H_2C=C(H)—R$ (I), wherein R is a straight chain ($C_1$-$C_{18}$)alkyl group. ($C_1$-$C_{18}$)alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$) alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene.

Carrier material: a porous particulate solid having pores and interior and exterior surfaces suitable for carrying a catalyst. Embodiments may be untreated or treated with a hydrophobing agent. The untreated carrier material may be a porous untreated silica and have variable surface area, pore volume, and average particle size. Each property is measured using conventional known techniques. The untreated silica may be amorphous silica (not quartz), alternatively a high surface area amorphous silica (e.g., from 500 to 1000 $m^2/g$), alternatively a high surface area fumed silica. Such silicas are commercially available from a number of sources. The silica may be in the form of spherical particles, which are obtained by a spray-drying process. The untreated silica may be calcined (i.e., dehydrated) or not calcined. The treated carrier material is made by treating an untreated carrier material with the hydrophobing agent. The treated carrier material may have different surface chemistry properties and/or dimensions than the untreated carrier material.

Composition: a chemical composition. Arrangement, type and ratio of atoms in molecules and type and relative amounts of molecules in a substance or material.

Compound: a molecule or collection of molecules.

Concentrating: a method of slowly increasing the mass or molar amount of less volatile chemical constituent(s) per unit volume of a continuous mixture comprising more volatile and less volatile chemical constituent(s). The method gradually removes more of the more volatile chemical constituent(s) than the less volatile constituent(s) from the continuous mixture to give a concentrate having a higher mass or molar amount of the less volatile chemical constituent(s) per unit volume than did the continuous mixture. The concentrate may be a precipitated solid.

Consisting essentially of, consist(s) essentially of, and the like. Partially-closed ended expressions that exclude anything that would affect the basic and novel characteristics of that which they describe, but otherwise allow anything else. In some aspects any one, alternatively each expression "consisting essentially of" or "consists essentially of" may be replaced by the closed-ended expression "consisting of" or "consists of", respectively.

(Co)polymerize: polymerize a monomer or copolymerize a monomer and at least one comonomer.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Dry. Anhydrous. A moisture content from 0 to less than 5 parts per million based on total parts by weight. Materials fed to the reactor(s) during a polymerization reaction are dry.

Effective amount: a quantity sufficient to achieve an appreciable result.

Ethylene: a compound of formula $H_2C=CH_2$.

Feeds. Quantities of reactants and/or reagents that are added or "fed" into a reactor. Each feed independently may be continuous or intermittent and measured, e.g., metered, to control amounts of the various reactants and reagents.

Film: claimed film properties are measured on 25 micrometers thick monolayer films.

Flow Index (190° C., 21.6 kg, "FI$_{21}$") Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.).

Gel permeation chromatography (GPC) Method: Weight-Average Molecular Weight Test Method: determine $M_w$, number average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}$=0.67, $K_{PS}$=0.000175, and $a_x$ and $K_x$ are obtained from published literature. For polyethylenes, $a_x/K_x$=0.695/0.000579. For polypropylenes $a_x/K_x$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/dLog(MW) on the y-axis versus Log(MW) on the x-axis to give a GPC chromatogram, wherein Log(MW) and dW/dLog(MW) are as defined above.

1-Hexene ("C$_6$"): $H_2C=C(H)(CH_2)_4CH_3$.

Hydrophobing agent: an organic or organosilicon compound that forms a stable reaction product with surface hydroxyl groups of fumed silica. Embodiments may be a polydiorganosiloxane compound or an organosilicon monomer, which contains silicon bonded leaving groups (e.g., Si-halogen, Si-acetoxy, Si-oximo (Si—ON=C<), Si-alkoxy, or Si-amino groups) that react with surface hydroxyl groups of untreated fumed silica to form Si—O—Si linkages with loss of water molecule as a by-product. The polydiorganosiloxane compound, such as a polydimethylsiloxane, contains backbone Si—O—Si groups wherein the oxygen atom can form a stable hydrogen bond to a surface hydroxyl group of fumed silica. The silicon-based hydrophobing agent may be trimethylsilyl chloride, dimethyldichlorosilane, a polydimethylsiloxane fluid, hexamethyldisilazane, an octyltrialkoxysilane (e.g., octyltrimethoxysilane), and a combination of any two or more thereof.

Induced condensing agent (ICA): An inert liquid useful for cooling materials in gas phase polymerization reactor(s) (e.g., a fluidized bed reactor). Embodiments may be a ($C_5$-$C_{20}$)alkane, alternatively a ($C_{11}$-$C_{20}$)alkane, alternatively a ($C_5$-$C_{10}$)alkane. In some aspects the ICA is a ($C_5$-$C_{10}$)alkane. In some aspects the ($C_5$-$C_{10}$)alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an inert condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %. The use of ICA is optional. In some aspects, including some of the inventive examples described later, an ICA is used. For example, in aspects of the method of making a mixture of ICA and catalyst may be fed into a polymerization reactor. In other aspects of the method, use of ICA may be omitted, and a mixed pre-formulated dry catalyst may be fed as such into the polymerization reactor, which lacks ICA.

Inert: Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Melt Index (190° C., 2.16 kilograms (kg), "$I_2$") Test Method: measured according to ASTM D1238-13, using conditions of 190° C./2.16 kg, formerly known as "Condition E" and also known as $I_2$. Report results in units of grams eluted per 10 minutes (g/10 min.).

Polyethylene: A macromolecule, or collection thereof, composed of constitutional units: (A) 100 mole percent (mol %) ethylenic units (homopolymer); or (B) from 50 to <100 mol %, alternatively 70 to <100 mol %, alternatively 80 to <100 mol %, alternatively 90 to <100 mol %, alternatively 95 to <100 mol % ethylenic and remaining olefinic comonomeric units, e.g., derived from at least one ($C_3$-$C_{20}$)alpha-olefin, alternatively ($C_4$-$C_{20}$)alpha-olefin.

Quartz: an untreated, nonporous crystalline form of silicon dioxide. Particulate or bulk.

Silica. A particulate form of silicon dioxide that may be amorphous. Crystalline, or gel-like. Includes fused quartz, fumed silica, silica gel, and silica aerogel. Fumed silica, hydrophobic pre-treated: a reaction product of contacting an untreated fumed silica with a hydrophobing agent to react with surface hydroxyl groups on the untreated fumed silica, thereby modifying the surface chemistry of the fumed silica to give a hydrophobic pre-treated fumed silica. The hydrophobing agent may be silicon based. Fumed silica, untreated: pyrogenic silica produced in a flame. Consists of amorphous silica powder made by fusing microscopic droplets into branched, chainlike, three-dimensional secondary particles, which agglomerate into tertiary particles. Not quartz.

Spray-drying: rapidly forming a particulate solid comprising less volatile chemical constituents via aspiration of a bulk mixture of the less volatile chemical constituents and more volatile chemical constituents through a nebulizer using a hot gas. The particle size and shape of the particulate solid formed by spray-drying may be different than those of a precipitated solid.

Support material: a non-porous particulate solid suitable for hosting on its exterior surfaces a catalyst.

System: an interrelated arrangement of different chemical constituents forming a functioning whole.

Transport: movement from place to place. Includes from reactor to reactor, tank to reactor, reactor to tank, and manufacturing plant to storage facility and vice versa.

EXAMPLES

Zirconocene Catalyst 1 (Zr1) supported on silica. Charge 575.7 kilograms (kg) of anhydrous toluene into a stirred reactor A (reactor A). Then add 481.24 kg of a 30 wt % solution of methylalumoxane (MAO) in toluene to reactor A. Rinse transfer lines with 49 kg of toluene, adding the rinsate to reactor A. While stirring the resulting solution at ambient temperature, add 41.8 kg of a 25 wt % solution of bis(1-methyl-3-butylcyclopentadienyl)zirconium dichloride from a vessel. Rinse the vessel and transfer line with 97.6 kg of toluene, adding the rinsate to reactor A. Continue mixing contents of reactor A for 60 minutes. Into another vessel, jacketed reactor B, charge 385.9 kg of dehydrated grade 948 silica (W. R. Grace). While stirring, slowly transfer the contents of reactor A into reactor B. Rinse reactor A with 136.2 kg of toluene, and add the rinsate into reactor B. Mix the contents in reactor B at ambient temperature for 60 minutes. Then add 27.2 kg of a 10 wt % solution of KEMAMINE AS 990 ($C_{18}H_{37}N(CH_2CH_2OH)_2$) in toluene to the mixture, and stir the resulting mixture in reactor B at ambient temperature for 30 minutes. Increase jacket temperature of reactor B to 80° C., and then dry the slurry under vacuum to give 558.4 kg of Zirconocene Catalyst 1 supported on silica as a free-flowing powder.

Zirconium Catalyst 2 spray-dried Zirconocene Catalyst System 2 (Zr2). Charge 18.1 kilograms (kg) of anhydrous toluene into a stirred reactor A (reactor A). Then add 10.9 kg of a 10 wt % solution of methylalumoxane (MAO) in toluene to reactor A. Next, 1.63 kg of CAB-O-SIL® TS-610 is charged to reactor A and the slurry is mixed overnight. While stirring the resulting slurry at ambient temperature, add 221 g of a 23.9 wt % solution of bis(1-methyl-3-butylcyclopentadienyl)zirconium dichloride. Continue mixing contents of reactor A for 60 minutes. The above slurry was then spray-dried using a pilot scale spray dryer. The slurry was fed to the spray-dryer at a feed rate of 120 pounds per hour. The atomizer speed was maintained at 90%. Maintain the outlet temperature at the condenser at about 80° C. and the inlet temperature at about 160° C. The final spray-dried catalyst composition ZR2 had a zirconium loading of 0.46 wt %, an aluminum loading of 15.5 wt % and 2.6 wt % residual toluene.

Titanocene Catalyst 1 (Ti1): stir $Cp_2TiCl_2$ (1.0 g) and T2MPAl (triisobutylaluminum; 20.1 mL, 1.0 M in toluene) with a magnetic stir bar for 30 minutes to give Titanocene Catalyst 1 as a solution in toluene.

Inventive Example 1 (IE1): Zirconocene-Titanocene Catalyst System 1. Add 150 mg of Zirconocene Catalyst 1 to a 40 mL vial. Add 0.05 mL of solution of Titanocene Catalyst 1 to the Zirconocene Catalyst 1 in the vial. Dilute the contents with hexane (10 mL), and allow the diluted mixture to sit at room temperature for 1 hour. Concentrate the resulting mixture under vacuum to yield Zirconocene-Titanocene Catalyst System 1 supported on silica as a solid material.

Inventive Example 2 (IE2): Zirconocene-Titanocene Catalyst System 2. Add 150 mg of Zirconocene Catalyst 1 to a 40 mL vial. Add 0.20 mL of solution of Titanocene Catalyst 1 to the Zirconocene Catalyst 1 in the vial. Dilute the contents with hexane (10 mL), and allow the diluted mixture to sit at room temperature for 1 hour. Concentrate the resulting mixture under vacuum to yield Zirconocene-Titanocene Catalyst System 2 supported on silica as a solid material.

Inventive Example 3 (1E3): Zirconocene-Titanocene Catalyst System 3. Add 150 mg of Zirconocene Catalyst 1 to a 40 mL vial. Add 0.80 mL of solution of Titanocene Catalyst 1 to the Zirconocene Catalyst 1 in the vial. Dilute the contents with hexane (10 mL), and allow the diluted mixture to sit at room temperature for 1 hour. Concentrate the resulting mixture under vacuum to yield Zirconocene-Titanocene Catalyst System 3 as a solid material.

Inventive Example 4 (IE4): Zirconocene-Titanocene Catalyst System 4 (prophetic). Use a Büchi B-290 mini spray-drier contained in a nitrogen atmosphere glovebox. Set the spray drier temperature at 165° C. and the outlet temperature at 60° to 70° C. Mix fumed silica (Cabosil TS-610, 3.2 g), MAO in toluene (10 wt %, 21 g), and bis(butylcyclopentadienyl)zirconium dimethyl (0.11 g) in toluene (72 g). To this mixture add 0.53 g of Titanocene Catalyst 1. Introduce the resulting mixture into an atomizing device, producing droplets that are then contacted with a hot nitrogen gas stream to evaporate the liquid therefrom, thereby making a powder. Separate the powder from the gas mixture in a cyclone separator, and collect the Zirconocene-Titanocene Catalyst System 4 spray-dried on silica as a powder in a cone can.

Inventive Example 5 (IE5): Zirconocene-Titanocene Catalyst System 5 (prophetic). Replicate the preparation of Zirconocene-Titanocene Catalyst System 4 except use 1.11 g of Titanocene Catalyst 1 instead of 0.53 g of Titanocene Catalyst 1, and collect the Zirconocene-Titanocene Catalyst System 5 spray-dried on silica as a powder in a cone can.

Inventive Example 6 (IE6): Zirconocene-Titanocene Catalyst System 6 (prophetic). Replicate the preparation of Zirconocene-Titanocene Catalyst System 4 except use 2.18 g of Titanocene Catalyst 1 instead of 0.53 g of Titanocene Catalyst 1, and collect the Zirconocene-Titanocene Catalyst System 6 spray-dried on silica as a powder in a cone can.

Inventive Example A (IE(A)): Slurry phase copolymerization of ethylene and 1-hexene catalyzed by the zirconocene-titanocene catalyst system of any one of IE1 to IE6 to give an ethylene/1-hexene copolymer composition. Employ a slurry phase reactor 2 liters (L), stainless steel autoclave equipped with a mechanical agitator. Cycle the reactor several times through a heat and nitrogen purge step to ensure that the reactor is clean and under an inert nitrogen atmosphere. Add about 1 L of liquid isobutane to the purged reactor at ambient temperature. Add 5 g of SMAO (silica supported methylalumoxane) as a scavenger under nitrogen pressure. Turn on the reactor agitator, and set rotation rate to 800 rotations per minute (rpm). Add molecular hydrogen and 1-hexene as specified below to the reactor. Heat the reactor to 80° C. Add ethylene to achieve an 862 kilopascal (kPa; 125 pounds per square inch (psi) differential pressure. Add about 50 milligrams (mg) of zirconocene catalyst and, optionally, the titanocene catalyst ($Cp_2TiCl_2$/T2MPAl) to the reactor as specified below from a shot cylinder using nitrogen pressure. Allow polymerization to proceed at 80° C. and continuously add ethylene to maintain a constant pressure. After 1 hour, vent and cool the reactor to ambient temperature, then open the reactor, and recover the ethylene/1-hexene copolymer. Report data later in Tables 1 and 2.

Inventive Example B (IE(B)): Gas phase polymerization of ethylene and 1-hexene catalyzed by the zirconocene-titanocene catalyst system of any one of IE1 to IE6 to give an ethylene/1-hexene copolymer composition. Employ a gas phase reactor 2 liters, stainless steel autoclave equipped with a mechanical agitator. Dry the reactor for 1 hour, charge dried reactor with 400 g of NaCl, and further dry by heating at 105° C. under nitrogen for 30 minutes. Then add 5 g of SMAO (silica supported methylalumoxane) as a scavenger under nitrogen pressure. After adding SMAO, seal the reactor, and stir reactor contents. Charge the reactor with 1-hexene and optionally hydrogen as specified below. Pressurize the charged reactor with ethylene (total pressure=225 psi). Allow the system to reach a steady state, then charge into the reactor about 20 mg of zirconocene catalyst and, optionally, the titanocene catalyst ($Cp_2TiCl_2$/T2MPAl). Bring reactor temperature to 80° C., and maintain at 80° C. throughout the experiment run. Maintain a constant $C_6/C_2$ molar ratio and ethylene pressure. Allow the polymerization to proceed for 60 minutes. Then vent and cool the reactor, and open it. Wash the resulting contents with water, then methanol, and dry them to give the ethylene/1-hexene copolymer composition. Determine the activity (kilograms copolymer made/gram catalyst used-hour, kg/g-hr) as a ratio of polymer yield to the amount of catalyst added to the reactor. Determine molecular weight (Mw) by GPC. Report data later in Table 3.

Comparative Example A (CE(A)): replicate IE(A) except omit titanocene catalyst. Report data later in Tables 1 and 2.

Comparative Example B (CE(B)): replicate IE(B) except omit titanocene catalyst. Report data later in Table 3.

In Tables 1-3, Ex. No. is Example Number; Cat. Sys. is catalyst system, which is non-inventive for comparative examples CE(A) and CE(B) and inventive for inventive examples IE(A) and IE(B); Cat. Prod. (kg/g-hr) is catalyst productivity in kilograms polymer made per gram catalyst-hour as described earlier; $C_6$=1-hexene; $H_2$ (L) is amount of molecular hydrogen gas used, if any, in liters; Mw is weight-average molecular weight of ethylene/1-hexene copolymer composition made as determined by GPC as described earlier; Mw/Mw(0) is weight-average molecular weight of ethylene/1-hexene copolymer composition made as determined by GPC as described earlier (Mw), divided by Mw(0), which is weight-average molecular weight of polymer made according to CE(A) or CE(B), i.e., in the absence of the titanocene catalyst, and is a way or normalizing the advantageous increase in Mw for the inventive catalyst system, method, and copolymer composition; Ti/Zr* is weight of the $Cp_2TiCl_2$ divided by weight of the zirconocene catalyst, in grams/grams; and Al/Zr^ is weight of trialkylaluminum (e.g., T2MPAl) divided by weight of the zirconocene catalyst, in grams/grams.

TABLE 1

Slurry Phase Polymerizations

| Ex. No. | Cat. Sys. | Ti (μmol Ti) | Cat. Prod. (kg/g-hr) | $C_6$ (mL) | $H_2$ (L) | Mw (g/mol) | Mw/ Mw(0) | Ti/Zr* (g/g) | Al/Zr^ (g/g) |
|---|---|---|---|---|---|---|---|---|---|
| CE(A)1 | Zr1 | 0 | 1.30 | 20 | 0 | 179,944 | 1.00 | 0 | 0 |
| IE(A)1 | Zr1/Ti1 | 1 | 1.59 | 20 | 0 | 186,245 | 1.04 | 0.005 | 0.02 |
| IE(A)2 | Zr1/Ti1 | 2 | 1.48 | 20 | 0 | 202,381 | 1.12 | 0.010 | 0.04 |
| IE(A)3 | Zr1/Ti1 | 4 | 1.49 | 20 | 0 | 201,963 | 1.12 | 0.020 | 0.08 |
| CE(A)2 | Zr1 | 0 | 2.18 | 20 | 0.15 | 138,687 | 1.00 | 0 | 0 |
| IE(A)4 | Zr1/Ti1 | 0.5 | 1.78 | 20 | 0.15 | 163,073 | 1.18 | 0.002 | 0.01 |
| IE(A)5 | Zr1/Ti1 | 1 | 1.56 | 20 | 0.15 | 170,880 | 1.23 | 0.005 | 0.02 |
| IE(A)6 | Zr1/Ti1 | 2 | 1.47 | 20 | 0.15 | 185,939 | 1.34 | 0.010 | 0.04 |

TABLE 1-continued

Slurry Phase Polymerizations

| Ex. No. | Cat. Sys. | Ti (µmol Ti) | Cat. Prod. (kg/g-hr) | $C_6$ (mL) | $H_2$ (L) | Mw (g/mol) | Mw/Mw(0) | Ti/Zr* (g/g) | Al/Zr^ (g/g) |
|---|---|---|---|---|---|---|---|---|---|
| IE(A)7 | Zr1/Ti1 | 4 | 1.40 | 20 | 0.15 | 188,297 | 1.36 | 0.020 | 0.08 |
| CE(A)3 | Zr1 | 0 | 3.97 | 60 | 0.3 | 116,174 | 1.00 | 0 | 0 |
| IE(A)8 | Zr1/Ti1 | 0.5 | 3.43 | 60 | 0.3 | 162,750 | 1.40 | 0.003 | 0.01 |
| IE(A)9 | Zr1/Ti1 | 1 | 3.05 | 60 | 0.3 | 171,638 | 1.48 | 0.005 | 0.02 |
| IE(A)10 | Zr1/Ti1 | 2 | 2.53 | 60 | 0.3 | 183,537 | 1.58 | 0.010 | 0.04 |
| IE(A)11 | Zr1/Ti1 | 4 | 2.66 | 60 | 0.3 | 183,927 | 1.58 | 0.020 | 0.08 |

As shown in Table 1, inventive zirconocene-titanocene catalyst systems and related slurry phase polymerization methods produced ethylene/alpha-olefin copolymer compositions having increased weight-average molecular weight (Mw) compared to comparative catalyst systems and methods having the zirconocene catalyst but lacking or free of the titanocene catalyst. Increase in polymer Mw was realized by introducing hydrogenation catalyst $Cp_2TiCl_2$/T2MPAl and polymerization catalyst CAT-1 into reactor separately. Under the condition that no external $H_2$ was added to the reactor, the addition of the titanocene catalyst resulted in increase in Mw. With addition of external $H_2$, a larger increase in Mw was obtained using the titanocene catalyst.

TABLE 2

Slurry Phase Polymerizations

| Ex. No. | Cat. Sys. | Ti (µmol Ti) | Cat. Prod. (kg/g-hr) | $C_6$ (mL) | $H_2$ (L) | Mw (g/mol) | Mw/Mw(0) | Ti/Zr* (g/g) | Al/Zr^ (g/g) |
|---|---|---|---|---|---|---|---|---|---|
| CE(A)4 | Zr1 | 0 | 1.30 | 20 | 0 | 179,944 | 1.00 | 0 | 0 |
| IE(A)12 | IE1 | 0.25 | 0.98 | 20 | 0 | 189,204 | 1.05 | 0.001 | 0.00 |
| IE(A)13 | IE2 | 1 | 0.85 | 20 | 0 | 270,698 | 1.50 | 0.005 | 0.02 |
| IE(A)14 | IE3 | 4 | 0.84 | 20 | 0 | 299,619 | 1.67 | 0.020 | 0.08 |

As shown in Table 2, inventive zirconocene-titanocene catalyst systems IE1 to IE3 and related slurry phase polymerization methods supported on silica produced ethylene/alpha-olefin copolymer compositions having further increased weight-average molecular weight (Mw) compared to comparative catalyst systems and methods having the zirconocene catalyst but lacking or free of the titanocene catalyst. When the titanocene catalyst was supported on the zirconocene catalyst, a higher Mw was obtained.

As shown in Table 1, inventive zirconocene-titanocene catalyst systems and related slurry phase polymerization methods produced ethylene/alpha-olefin copolymer compositions having increased weight-average molecular weight (Mw) compared to comparative catalyst systems and methods having the zirconocene catalyst but lacking or free of the titanocene catalyst.

Inventive Example C1 separate feeding of zirconocene catalyst and titanocene catalyst into batch reactor to make zirconocene-titanocene catalyst system in situ, followed by polymerizing (IE(C1s)). Employ a slurry phase reactor 2 liters (L), stainless steel autoclave equipped with a mechanical agitator. Cycle the reactor several times through a heat and nitrogen purge step to ensure that the reactor is clean and under an inert nitrogen atmosphere. Add about 1 L of liquid isobutane to the purged reactor at ambient temperature. Add 5 g of SMAO (silica supported methylalumoxane) as a scavenger under nitrogen pressure. Turn on the reactor agitator, and set rotation rate to 800 rotations per minute (rpm). Add molecular hydrogen and 1-hexene as specified below to the reactor. Heat the reactor to 80° C. Add ethylene to achieve 862 kPa (125 psi) differential pressure. Add the titanocene catalyst ($Cp_2TiCl_2$/T2MPAl) to the reactor (if required) as specified below, and then separately add about 50 milligrams (mg) of zirconocene catalyst to the reactor. Allow polymerization to proceed at 80° C. and continuously

TABLE 3

Gas Phase Polymerizations.

| Ex. No. | Cat. Sys. | Ti (µmol Ti) | Cat. Prod. (kg/g-hr) | $C_6$ (mL) | $H_2$ (L) | Mw (g/mol) | Mw/Mw(0) | Ti/Zr* (g/g) | Al/Zr^ (g/g) |
|---|---|---|---|---|---|---|---|---|---|
| CE(B)1 | Zr1 | 0 | 2.47 | 0.02 | 0 | 143,136 | 1.00 | 0 | 0 |
| IE(B)1 | Zr1/Ti1 | 1 | 2.10 | 0.02 | 0 | 147,172 | 1.03 | 0.012 | 0.05 |
| IE(B)2 | Zr1/Ti1 | 2 | 1.88 | 0.02 | 0 | 156,161 | 1.09 | 0.025 | 0.10 |
| IE(B)3 | Zr1/Ti1 | 4 | 1.99 | 0.02 | 0 | 168,780 | 1.18 | 0.050 | 0.20 |
| CE(B)2 | Zr1 | 0 | 2.34 | 0.02 | 0.35 | 102,622 | 1.00 | 0 | 0 |
| IE(B)4 | Zr1/Ti1 | 0.5 | 3.12 | 0.02 | 0.35 | 119,728 | 1.17 | 0.006 | 0.02 |
| IE(B)5 | Zr1/Ti1 | 1 | 3.49 | 0.02 | 0.35 | 124,876 | 1.22 | 0.012 | 0.05 |
| IE(B)6 | Zr1/Ti1 | 2 | 3.48 | 0.02 | 0.35 | 122,478 | 1.19 | 0.025 | 0.10 |
| IE(B)7 | Zr1/Ti1 | 4 | 2.59 | 0.02 | 0.35 | 151,499 | 1.48 | 0.049 | 0.19 |
| IE(B)8 | IE1 | 0.25 | 2.16 | 0.02 | 0 | 161,633 | 1.13 | 0.003 | 0.01 |
| IE(B)9 | IE2 | 1 | 1.07 | 0.02 | 0 | 197,894 | 1.38 | 0.013 | 0.05 |

As shown in Table 3, inventive zirconocene-titanocene catalyst systems and related gas phase polymerization methadd ethylene to maintain a constant pressure. After one hour, vent and cool the reactor to ambient temperature, then open the reactor, and recover the ethylene/1-hexene copolymer composition. Results are reported later in Table 4.

Inventive Example C2 premixing zirconocene catalyst and titanocene catalyst in a mixer to give an unaged premixture thereof, and feeding the unaged premixture into a batch reactor, followed by polymerizing (IE(C2p)). Employ a slurry phase reactor 2 L, stainless steel autoclave equipped with a mechanical agitator. Cycle the reactor several times through a heat and nitrogen purge step to ensure that the reactor is clean and under an inert nitrogen atmosphere. Add about 1 L of liquid isobutane to the purged reactor at ambient temperature. Add 5 g of SMAO (silica supported methylalumoxane) as a scavenger under nitrogen pressure. Turn on the reactor agitator, and set rotation rate to 800 rpm. Add molecular hydrogen and 1-hexene as specified below to the reactor. Heat the reactor to 80° C. Add ethylene to achieve a 862 kPa (125 psi) differential pressure. Premixing about 50 mg of zirconocene catalyst and an amount of the titanocene catalyst ($Cp_2TiCl_2$/T2MPAl), the latter amount being indicated by the Ti/Zr* and Al/Zr^ ratios in Table 4 later, together for 30 minutes, and then add the resulting unaged premixture to the reactor. Allow polymerization to proceed at 80° C. and continuously add ethylene to maintain a constant pressure. After one hour, vent and cool the reactor to ambient temperature, then open the reactor, and recover the ethylene/1-hexene copolymer composition. Results are reported below in Table 4.

Comparative Examples C (CE(C)1 to CE(C)6): replicate IE(C) except omit titanocene catalyst. Report data below in Table 4.

lyst and the titanocene catalyst are added into the reactor separately or premixed for a period of time and then added premixed together into the reactor. Embodiments wherein the zirconocene catalyst and the titanocene catalyst are added separately into the reactor at the same Ti/Zr* and Al/Zr^ ratios beneficially achieve higher catalyst productivity. This trend is consistent when the polymerization reaction is conducted in the presence of comonomer ($C_6$) without added $H_2$, or in the absence of comonomer ($C_6$) without added $H_2$, or in the presence of comonomer ($C_6$) with added $H_2$.

Comparative Example (D) gas phase fluidized-bed pilot plant reactor; zirconocene catalyst; no titanocene catalyst; polymerize ethylene and 1-hexene; continuous feeding (CE (D)). Utilizing a syringe pump, feed a slurry of Zr2 catalyst in mineral oil into reactor through a catalyst injection line containing a helical static mixer. Add 1.4 kg per hour (3 pounds per hour (lb/hr)) of isopentane into the catalyst injection line after the catalyst injection line and before the helical static mixer. After the helical static mixer, add nitrogen into the injection line at 2.3 kg/hr (5 lb/hr). Inject the slurry catalyst from the catalyst injection line into the reactor through an outer tube or shroud using an additional 1.8 kg/hr (4 lb/hr) of nitrogen and 3.2 to 3.6 kg/hr (7 to 8 lbs/hr) of isopentane through the outer tube. After equilibrium was reached, conduct polymerization under the respective conditions shown later in Table 5. Initiate polymerization by continuously feeding the slurry Zr2 catalyst into the fluidized bed of polyethylene granules, together with ethylene and 1-hexene. Hydrogen gas was not fed to the reactor, but hydrogen was generated in situ during polymerization. Inert gases, nitrogen, and isopentane made up the remaining pressure in the reactor. Continuously removed ethylene/1-

TABLE 4 slurry phase polymerizations using separately fed zirconocene and titanocene catalysts (IE(C1s)) or premixed and then fed zirconocene and titanocene catalysts (IE(C2p)).

| Ex. No. | Cat. Sys. | Ti (μmol) | Cat. Prod. (kg/g-hr) | $C_6$ (mL) | $H_2$ (L) | Mw (g/mol) | Mw/Mw(0) | Ti/Zr* (g/g) | Al/Zr^ (g/g) |
|---|---|---|---|---|---|---|---|---|---|
| CE(C)1 | Zr1 only | 0 | 1.24 | 20 | 0 | 174,830 | 1 | 0 | 0 |
| IE(C1s)1 | Zr1/Ti1 | 1 | 1.15 | 20 | 0 | 258,735 | 1.48 | 0.005 | 0.02 |
| IE(C1s)2 | Zr1/Ti1 | 4 | 1.16 | 20 | 0 | 293,390 | 1.68 | 0.02 | 0.08 |
| IE(C1s)3 | Zr1/Ti1 | 10 | 0.81 | 20 | 0 | 340,084 | 1.95 | 0.05 | 0.2 |
| CE(C)2 | Zr1 only | 0 | 1.32 | 20 | 0 | 180,047 | 1 | 0 | 0 |
| IE(C2p)4 | Zr1/Ti1 | 1 | 0.85 | 20 | 0 | 263,974 | 1.47 | 0.005 | 0.02 |
| IE(C2p)5 | Zr1/Ti1 | 4 | 0.77 | 20 | 0 | 348,957 | 1.94 | 0.02 | 0.08 |
| IE(C2p)6 | Zr1/Ti1 | 10 | 0.56 | 20 | 0 | 354,347 | 1.97 | 0.05 | 0.2 |
| CE(C)3 | Zr1 only | 0 | 0.39 | 0 | 0 | 298,363 | 1 | 0 | 0 |
| IE(C1s)7 | Zr1/Ti1 | 1 | 0.38 | 0 | 0 | 454,434 | 1.52 | 0.005 | 0.02 |
| IE(Cs)8 | Zr1/Ti1 | 2 | 0.36 | 0 | 0 | 471,734 | 1.58 | 0.01 | 0.04 |
| IE(C1s)9 | Zr1/Ti1 | 14 | 0.31 | 0 | 0 | 477,336 | 1.60 | 0.07 | 0.28 |
| IE(C1s)10 | Zr1/Ti1 | 20 | 0.29 | 0 | 0 | 500,669 | 1.68 | 0.1 | 0.4 |
| CE(C)4 | Zr1 only | 0 | 0.41 | 0 | 0 | 307,088 | 1 | 0 | 0 |
| IE(C2p)11 | Zr1/Ti1 | 1 | 0.37 | 0 | 0 | 318,530 | 1.04 | 0.005 | 0.02 |
| IE(C2p)12 | Zr1/Ti1 | 2 | 0.34 | 0 | 0 | 545,013 | 1.77 | 0.01 | 0.04 |
| IE(C2p)13 | Zr1/Ti1 | 14 | 0.26 | 0 | 0 | 782,822 | 2.55 | 0.07 | 0.28 |
| IE(C2p)14 | Zr1/Ti1 | 20 | 0.25 | 0 | 0 | 897,819 | 2.92 | 0.1 | 0.4 |
| CE(C)5 | Zr1 only | 0 | 1.80 | 20 | 1 | 28,572 | 1 | 0 | 0 |
| IE(C1s)15 | Zr1/Ti1 | 0.5 | 1.88 | 20 | 1 | 74,981 | 2.62 | 0.0025 | 0.01 |
| IE(C1s)16 | Zr1/Ti1 | 1 | 1.94 | 20 | 1 | 65,372 | 2.29 | 0.005 | 0.02 |
| IE(C1s)17 | Zr1/Ti1 | 2 | 2.10 | 20 | 1 | 133,922 | 4.69 | 0.01 | 0.04 |
| CE(C)6 | Zr1 only | 0 | 1.57 | 20 | 1 | 24,959 | 1 | 0 | 0 |
| IE(C2p)18 | Zr1/Ti1 | 0.5 | 1.74 | 20 | 1 | 34,465 | 1.38 | 0.0025 | 0.01 |
| IE(C2p)19 | Zr1/Ti1 | 1 | 1.91 | 20 | 1 | 72,129 | 2.89 | 0.005 | 0.02 |
| IE(C2p)20 | Zr1/Ti1 | 2 | 2.00 | 20 | 1 | 106,845 | 4.28 | 0.01 | 0.04 |

As shown in Table 4, relative to comparative examples an increase in polymer Mw is achieved by introducing the titanocene catalyst, no matter whether the zirconocene catahexene copolymer product from reactor to maintain a constant bed weight of granules in the reactor. Results in Table 5.

Inventive Example (D1) gas phase fluidized-bed pilot plant reactor; zirconocene and titanocene catalyst, separately fed into reactor to make zirconocene-titanocene catalyst system in situ; polymerize ethylene and 1-hexene; continuous feeding (IE(D1s)). Replicate the procedure of CE(D) except also add isopentane solution of titanocene catalyst Ti1 directly into reactor via a separate injection line (IE (D1s). Results in Table 5.

in a batch mixer to make a premixture, aged premixture for 2 days, and then fed resulting aged premixture into reactor; polymerize ethylene and 1-hexene; continuous feeding (IE (D1s)). Replicate the procedure of CE(D) except first mix isopentane solution of titanocene catalyst Ti1 and Zr2 in a mixture to form a premixture, age premixture for 2 days, and feed aged premixture into reactor (IE(D3a). Results are reported below in Table 5.

TABLE 5 continuous gas phase fluidized bed pilot plant reactor polymerizations using
separately fed zirconocene and titanocene catalysts (IE(D1s)); premixed
and fed zirconocene and titanocene catalysts (IE(D2p)) unaged; or premixed,
aged, and then fed zirconocene and titanocene catalysts (IE(D3a)).

| Ex. No. | CE(D) | IE(D1s) | IE(D2p) | IE(D3a) |
|---|---|---|---|---|
| Zirconocene and Titanocene Catalyst Mixing | None | In situ in reactor (Separate Feeds) | In-line pre-mixing; no aging before feeding | Pre-mixing and aging before feeding |
| Catalyst or Catalyst System | Zr2 only | In situ reactor made Zr2 + Ti1 | Unaged premixture Zr2 + Ti1 | Aged Premixture Zr2 + Ti1 |
| Zirconocene Catalyst | Zr2 | Zr2 | Zr2 | Zr2 |
| Zr atom wt % in Zr2 Feed | 0.0757 | 0.0757 | 0.0757 | 0.0657 |
| Titanocene Catalyst | None | Ti1 | Ti1 | Ti1 |
| $Cp_2TiCl_2$ wt % in Feed | None | 0.06* | 0.06* | 0.332** |
| REACTOR CONDITIONS (RC) | RC | RC | RC | RC |
| Temperature (° C.) | 85 | 85 | 85 | 85 |
| Pressure (MPa) | 2.64 | 2.65 | 2.66 | 2.65 |
| Ethylene Partial Pressure (MPa) | 1.0 | 1.0 | 1.0 | 1.0 |
| $H_2$/Ethylene Molar Ratio | 0.000087 | 0.000039 | 0.000039 | 0.000050 |
| $H_2/C_2$ Molar Ratio | 0.87 | 0.39 | 0.39 | 0.50 |
| 1-Hexene/Ethylene Molar Ratio | 0.0060 | 0.0060 | 0.0060 | 0.0060 |
| Isopentane Mole % | 11.9 | 12.2 | 12.5 | 10.9 |
| Ethylene Feed (kg/hr) | 25.8 | 15.3 | 10.8 | 15.0 |
| 1-Hexene Feed (kg/hr) | 0.39 | 0.29 | 0.21 | 0.26 |
| $H_2$ Feed (kg/hr) | 0.000 | 0.000 | 0.000 | 0.000 |
| Reactor Vent (kg/hr) | 13.6 | 13.4 | 14.2 | 21.0 |
| Total Slurry Feed Rate (cc/hr) | 23.0 | 23.0 | 23.0 | 26.5 |
| Slurry Cat Feed Rate (g/hr) | 19.6 | 19.6 | 19.6 | 19.5 |
| Zr atom feed rate (from Zr2 catalyst) (g/hr) | 0.015 | 0.015 | 0.015 | 0.015 |
| Ti1 Solution Feed Rate (cc/hr) | None | 199 | 200 | 0 |
| $Cp_2TiCl_2$ Feed Rate (g/hr) | 0.000 | 0.074 | 0.074 | 0.075 |
| $Cp_2TiCl_2$/Zr Molar Ratio | 0.00 | 1.83 | 1.84 | 1.85 |
| Production Rate (kg/hr) | 22.1 | 11.0 | 5.13 | 8.35 |
| Slurry Catalyst Productivity (kg/kg) | 1,132 | 561 | 263 | 428 |
| % of CE(D) Productivity | 100% | 50% | 23% | 38% |
| Bed Weight (kg) | 54.0 | 55.3 | 54.9 | 55.8 |
| Residence Time avgPRT (hr) | 2.5 | 5.1 | 10.7 | 6.7 |
| RESIN PROPERTIES (RP) | RP | RP | RP | RP |
| Flow Index (FI21) (g/10 min.) | 1.86 | 0.35 | 0.16 | 0.54 |
| Density (g/cm3) | 0.9298 | 0.9257 | 0.9269 | 0.9284 | conc. is concentration, cc is cubic centimeters, hr is hour, min. is minutes, feed is solution of $Cp_2TiCl_2$/T2MPAl in isopentane, feed is slurry of $Cp_2TiCl_2$, Zr2 and T2MPAl in mineral oil.

Inventive Example (D2) gas phase fluidized-bed pilot plant reactor; zirconocene and titanocene catalyst, premixed in an in-line mixer the zirconocene catalyst and titanocene catalyst to make unaged premixture thereof, and within less than 5 minutes (about 1 minute) fed the unaged premixture into reactor; polymerize ethylene and 1-hexene; continuous feeding (IE(D1s)). Replicate the procedure of CE(D) except also add isopentane solution of titanocene catalyst Ti1 into feed line just before the in-line helical static mixer to form a premixture with the Zr2, and feed premixture into reactor (IE(D2p)). Results in Table 5.

Inventive Example (D3) gas phase fluidized-bed pilot plant reactor; zirconocene and titanocene catalyst, premixed As shown in Table 5 for a continuous polymerization operation, ethylene/1-hexene copolymers with lower melt flow rates $FI_{21}$ (higher molecular weight) are produced at lower production rates when the titanocene catalyst is used. Surprisingly, catalyst mixing modes of separately adding zirconocene and titanocene catalysts (IE(D1s)) and in-line premixing of these catalysts (IE(D2p)) show advantages over the premixing/aging mode (IE(D3a)). These include the increased ability of IE(D1s) and IE(D2p) to remove $H_2$ being generated in the polymerization reactor relative to that of IE(D3a). The increased ability to remove $H_2$ beneficially allows polymerization to make a product resin having a lower $FI_{21}$ at a given set of reactor conditions. The advantages also include IE(D1s) having higher catalyst productivity than that of IE(D2p). The separate addition mode (IE(D1s) has the highest production rate with copolymer product $FI_{21}$ lower than copolymer product $FI_{21}$ made using catalysts premixing/aging (IE(D3a). And the In-line mixing mode (IE(D2p)) has the lowest copolymer product $FI_{21}$ (highest molecular weight), substantially lower than what is obtained from the premixing/aging mode (IE(D3a)).

The invention claimed is:

1. A zirconocene-titanocene catalyst system comprising a zirconocene catalyst and a titanocene catalyst, wherein the zirconocene catalyst comprises a product of an activation reaction of $((R^1)_x$-cyclopentadienyl)$((R^2)_y$-cyclopentadienyl)zirconium dichloride/dibromide/dialkyl and an alkylaluminoxane, wherein subscript x is 1 or 2; subscript y is 0, 1 or 2; and each $R^1$ and $R^2$ independently is methyl, ethyl, a normal-$(C_3$-$C_{10})$alkyl (linear), or an iso-$(C_3$-$C_{10})$alkyl; and wherein the titanocene catalyst comprises a product of an activation reaction of bis(cyclopentadienyl)titanium dichloride with a trialkylaluminum; wherein a weight/weight ratio of trialkylaluminum to the zirconocene catalyst is from 0.005 to 0.25; wherein a weight/weight ratio of bis(cyclopentadienyl)titanium dichloride to the zirconocene catalyst is from 0.001 to 0.05; and wherein: (i) subscript x is 1 and subscript y is 0, or (ii) subscripts x and y are each 1, or (iii) subscript x is 1 and subscript y is 2, or (iv) subscript x is 2 and subscript y is 0, or (v) subscript x is 2 and subscript y is 1, or (vi) subscript x is 2 and subscript y is 2.

2. The zirconocene-titanocene catalyst system of claim 1 further comprising a metal carboxylate salt, wherein the metal carboxylate salt is represented by the formula: $MQ_m(O_2CR)_n$, wherein M is a metal atom of Group 2 or Group 13 of the Periodic table of Elements; Q is a halogen, hydroxy, alkyl, alkoxy, aryloxy, siloxy, silyl, or sulfonate group; R is a $(C_5$-$C_{30})$hydrocarbyl; subscript m is an integer from 0 to 3; subscript n is an integer from 1 to 3; and the sum of subscripts m and n is equal to the valence of M.

3. The zirconocene-titanocene catalyst system of claim 1 characterized by any one of limitations (i) to (viii): (i) the $((R^1)_x$-cyclopentadienyl)$((R^2)_y$-cyclopentadienyl)zirconium dichloride/dibromide/dialkyl is selected from bis(butylcyclopentadienyl)zirconium dichloride, bis(butylcyclopentadienyl)zirconium dibromide, bis(butylcyclopentadienyl)zirconium dimethyl, or bis(butylcyclopentadienyl)zirconium diethyl; (ii) the $((R^1)_x$-cyclopentadienyl)$((R^2)_y$-cyclopentadienyl)zirconium dichloride/dibromide/dialkyl is bis(butylcyclopentadienyl)zirconium dichloride; (iii) the $((R^1)_x$-cyclopentadienyl)$((R^2)_y$-cyclopentadienyl)zirconium dichloride/dibromide/dialkyl is bis(butylcyclopentadienyl)zirconium dimethyl; (iv) the $((R^1)_x$-cyclopentadienyl)$((R^2)_y$-cyclopentadienyl)zirconium dichloride/dibromide/dialkyl is bis(butylcyclopentadienyl)zirconium diethyl; (v) the $((R^1)_x$-cyclopentadienyl)$((R^2)_y$-cyclopentadienyl)zirconium dichloride/dibromide/dialkyl is selected from bis(1-methyl-3-butylcyclopentadienyl)zirconium dichloride, bis(1-methyl-3-butylcyclopentadienyl)zirconium dibromide, bis(1-methyl-3-butylcyclopentadienyl)zirconium dimethyl, or bis(1-methyl-3-butylcyclopentadienyl)zirconium diethyl; (vi) the $((R^1)_x$-cyclopentadienyl)$((R^2)_y$-cyclopentadienyl)zirconium dichloride/dibromide/dialkyl is bis(1-methyl-3-butylcyclopentadienyl)zirconium dichloride; (vii) the $((R^1)_x$-cyclopentadienyl)$((R^2)_y$-cyclopentadienyl)zirconium dichloride/dibromide/dialkyl is bis(1-methyl-3-butylcyclopentadienyl)zirconium dimethyl; and (viii) the $((R^1)_x$-cyclopentadienyl)$((R^2)_y$-cyclopentadienyl)zirconium dichloride/dibromide/dialkyl is bis(1-methyl-3-butylcyclopentadienyl)zirconium diethyl.

4. The zirconocene-titanocene catalyst system of claim 1 wherein the trialkylaluminum is selected from any one of limitations (i) to (vii): (i) tri$(C_1$-$C_8)$alkyl)aluminum, (ii) tri$((C_3$-$C_7)$alkyl)aluminum, (iii) tri$((C_4$-$C_6)$alkyl)aluminum, (iv) tri$((C_4)$alkyl)aluminum, (v) tri$((C_6)$alkyl)aluminum, (vi) tri(2-methylpropyl)aluminum, or (vii) tri(hexyl)aluminum.

5. The zirconocene-titanocene catalyst system of claim 1 wherein the zirconocene catalyst is supported on a carrier material.

6. The zirconocene-titanocene catalyst system of claim 1 wherein the zirconocene catalyst and, optionally, the titanocene catalyst, is spray-dried on a carrier material.

7. A method of making a zirconocene-titanocene catalyst system of claim 1, the method comprising contacting the $((R^1)_x$-cyclopentadienyl)$((R^2)_y$-cyclopentadienyl)zirconium dichloride/dibromide/dialkyl with an alkylaluminoxane and, optionally, a carrier material and, optionally, a metal carboxylate salt of the formula: $MQ_m(O_2CR)_n$, to give zirconocene catalyst, and then contacting the zirconocene catalyst with a titanocene catalyst made by an activation reaction of bis(cyclopentadienyl)titanium dichloride with a trialkylaluminum; thereby giving the titanium catalyst and the zirconocene-titanocene catalyst system; wherein M is a metal atom of Group 2 or Group 13 of the Periodic table of Elements; Q is a halogen, hydroxy, alkyl, alkoxy, aryloxy, siloxy, silyl, or sulfonate group; R is a $(C_5$-$C_{30})$hydrocarbyl; subscript m is an integer from 0 to 3; subscript n is an integer from 1 to 3; and the sum of subscripts m and n is equal to the valence of M.

8. A method of making a polyethylene composition, the method comprising contacting ethylene and optionally zero, one, or more $(C_3$-$C_{20})$alpha-olefin with the zirconocene-titanocene catalyst system of claim 1 in a polymerization reactor to generate a polymerization reaction giving a polyethylene composition comprising a polyethylene homopolymer or ethylene/$(C_3$-$C_{20})$alpha-olefin copolymer, respectively, and the zirconocene-titanocene catalyst system, or a by-product thereof.

9. The method of claim 8 characterized by any one of limitations (i) to (iv): (i) externally-sourced molecular hydrogen gas $(H_2)$ is not added into the polymerization reactor and is not present during the contacting step of the method; (ii) the method further comprises adding externally-sourced $H_2$ gas into the polymerization reactor during the contacting step of the method; (iii) the method is free of $(C_3$-$C_{20})$alpha-olefin and makes polyethylene homopolymer, which contains constituent units that are derived from ethylene only; (iv) the method further comprises one or more $(C_3$-$C_{20})$alpha-olefin and makes ethylene/$(C_3$-$C_{20})$alpha-olefin copolymer, which contains monomeric constituent units that are derived from ethylene and comonomeric constituent units that are derived from the one or more $(C_3$-$C_{20})$alpha-olefin.

10. The method of claim 8 comprising a gas phase polymerization optionally in the presence of added external molecular hydrogen gas $(H_2)$, optionally in the presence of an induced condensing agent (ICA); and in one, two or more gas phase polymerization reactors under (co)polymerizing conditions, thereby making the polyethylene composition; wherein the (co)polymerizing conditions comprise a reaction temperature from 80° C. to 110° C.; a molar ratio of the molecular hydrogen gas to the ethylene from 0.00001 to 0.25; and a molar ratio of the one or more $(C_3$-$C_{20})$alpha-olefin to the ethylene from 0.001 to 0.20.

11. The method of claim 8 wherein prior to the contacting step the method further comprises any one of steps (i) to (iii): (i) mixing the zirconocene catalyst and the titanocene catalyst in a separate mixing vessel to make a mixture thereof, aging the mixture for from 2 hours to 7 days to make an aged mixture, and then feeding the aged mixture into the polymerization reactor; (ii) mixing the zirconocene catalyst and the titanocene catalyst with each other in a mixer to make an unaged mixture thereof, and within 120 minutes of the mixing, feeding the unaged mixture into the polymerization reactor; and (iii) feeding the zirconocene catalyst and the titanocene catalyst separately via separate reactor inlets into the polymerization reactor, thereby making the zirconocene-titanocene catalyst system in situ in the polymerization reactor.

\* \* \* \* \*